US011642832B2

(12) United States Patent
Yamada et al.

(10) Patent No.: US 11,642,832 B2
(45) Date of Patent: May 9, 2023

(54) FILM, DECORATED MOLDED ARTICLE HAVING FILM ADHERED TO SURFACE OF ADHERED, AND METHOD FOR MANUFACTURING DECORATED MOLDED ARTICLE

(71) Applicant: KURARAY CO., LTD., Kurashiki (JP)

(72) Inventors: Yoshimi Yamada, Tsukuba (JP); Ryota Hashimoto, Chiyoda-ku (JP); Kirihiro Nakano, Tsukuba (JP); Yoshirou Kondou, Tsukuba (JP); Yoshiki Mukoo, Tsukuba (JP)

(73) Assignee: KURARAY CO., LTD., Kurashiki (JP)

( * ) Notice: Subject to any disclaimer, the term of this patent is extended or adjusted under 35 U.S.C. 154(b) by 612 days.

(21) Appl. No.: 16/320,690

(22) PCT Filed: Jul. 27, 2017

(86) PCT No.: PCT/JP2017/027194
§ 371 (c)(1),
(2) Date: Jan. 25, 2019

(87) PCT Pub. No.: WO2018/021460
PCT Pub. Date: Feb. 1, 2018

(65) Prior Publication Data

US 2019/0160726 A1 May 30, 2019

(30) Foreign Application Priority Data

Jul. 27, 2016 (JP) ............................ JP2016-147121

(51) Int. Cl.
*B29C 51/10* (2006.01)
*C09J 201/00* (2006.01)
(Continued)

(52) U.S. Cl.
CPC ............ *B29C 51/10* (2013.01); *B29C 51/145* (2013.01); *B32B 27/00* (2013.01); *B32B 27/02* (2013.01);
(Continued)

(58) Field of Classification Search
CPC . B29C 51/10; B29C 51/145; B29C 2791/006; B29C 51/14; B29C 51/002;
(Continued)

(56) References Cited

U.S. PATENT DOCUMENTS 3,122,598 A 2/1964 Berger
5,854,149 A 12/1998 Nagayama et al.
(Continued)

FOREIGN PATENT DOCUMENTS

CN 1946533 A 4/2007
CN 101426646 A 5/2009
(Continued)

OTHER PUBLICATIONS

Combined Chinese Office Action and Search Report dated Oct. 10, 2020 in Chinese Patent Application No. 201780046386.1, 7 pages.
(Continued)

*Primary Examiner* — Camie S Thompson
(74) *Attorney, Agent, or Firm* — Oblon, McClelland, Maier & Neustadt, L.L.P.

(57) ABSTRACT

Provided are a film which can be decorated even against a three-dimensional shape, is excellent in moldability during decoration (adhesion) on an adherend, is able to reduce concaves and convexes with a variety of sizes which the adherend surface has, and makes an appearance quality favorable; and a decorative molded product having the film. The film is a film including a layer containing a thermoplastic resin, wherein when a highest temperature of glass transition temperatures of the film is designated as Tg [+ C],
(Continued)

1

2 a temperature T [° C.] at which an elongation at break is 50% or more exists in a range of Tg to (Tg+50 [° C.]), and when, with respect to concaves and convexes of an abrasive grain surface of a polyester film sheet having, as an abrasive grain, aluminum oxide having a grain size of 12 μm coated thereon, an amplitude relative to a spatial frequency f is designated as $A_1(f)$; with respect to concaves and convexes of a film surface when adhering the film to the abrasive grain surface at any temperature of the range of Tg to (Tg+50 [° C.]) and a pressure of 0.3 MPa, an amplitude relative to the spatial frequency f is designated as $A_2(f)$; and a ratio of $A_2(f)$ to $A_1(f)$ is designated as $\phi(f)=A_2(f)/A_1(f)$, a minimum value fc of spatial frequencies where $\phi(f)$ is 0.1 is 2.0 $mm^{-1}$ or less.

13 Claims, 13 Drawing Sheets

(51) Int. Cl.
*B32B 27/00* (2006.01)
*B29C 51/14* (2006.01)
*B32B 27/02* (2006.01)
*B32B 27/08* (2006.01)

(52) U.S. Cl.
CPC ............. *B32B 27/08* (2013.01); *C09J 201/00* (2013.01); *B29C 2791/006* (2013.01); *B32B 2451/00* (2013.01)

(58) Field of Classification Search
CPC ........ C09J 201/00; B32B 27/00; B32B 27/02; B32B 27/08; B32B 2451/00; B32B 27/365; B32B 27/32; B32B 7/12; B32B 2264/102; B32B 9/045; C08J 5/18; Y10T 428/24355; Y10T 428/2495; Y10T 428/24967; Y10T 428/31786; C09D 7/45
USPC ......... 264/511; 428/215, 213, 141, 480, 221
See application file for complete search history.

(56) References Cited

U.S. PATENT DOCUMENTS

| | | | | |
|---|---|---|---|---|
| 6,974,620 | B1 * | 12/2005 | Tsunekawa | H01G 4/20 428/141 |
| 2006/0160927 | A1 * | 7/2006 | Surplice | C08K 5/3472 523/179 |
| 2008/0032146 | A1 * | 2/2008 | Toyoshima | B32B 27/28 428/483 |
| 2008/0318074 | A1 | 12/2008 | Suga et al. | |
| 2009/0311493 | A1 | 12/2009 | Manabe et al. | |
| 2010/0239800 | A1 | 9/2010 | Ikeda et al. | |
| 2013/0157069 | A1 | 6/2013 | Minamide et al. | |
| 2013/0214449 | A1 | 8/2013 | Suga et al. | |
| 2015/0158268 | A1 | 6/2015 | Koike et al. | |

FOREIGN PATENT DOCUMENTS

| | | | | |
|---|---|---|---|---|
| CN | 103068915 | A | | 4/2013 |
| CN | 103764385 | A | | 4/2014 |
| CN | 104817970 | A | | 8/2015 |
| EP | 0 758 577 | A1 | | 2/1997 |
| JP | H0399748 | | * | 3/1991 |
| JP | 2008-151861 | A | | 7/2008 |
| JP | 4645334 | B2 | | 3/2011 |
| JP | 5406002 | B2 | | 2/2014 |
| JP | 2014-117850 | A | | 6/2014 |
| JP | 2016-4242 | A | | 1/2016 |
| TW | 200909515 | A | | 3/2009 |
| WO | WO 2016/111286 | A1 | | 7/2016 |
| WO | WO 2016/121868 | A1 | | 8/2016 |

OTHER PUBLICATIONS

International Search Report dated Oct. 24, 2017, in PCT/JP2017/027194, filed Jul. 27, 2017.
Combined Taiwanese Office Action and Search Report dated Dec. 7, 2020 in Patent Application No. 106125308 (with English translation of Category of Cited Documents), 5 pages.
Extended European Search Report dated Feb. 17, 2020 in Patent Application No. 17834462.8, 9 pages.

* cited by examiner

FILM, DECORATED MOLDED ARTICLE HAVING FILM ADHERED TO SURFACE OF ADHERED, AND METHOD FOR MANUFACTURING DECORATED MOLDED ARTICLE

TECHNICAL FIELD

The present invention relates to a film which is adhered to an adherend having a concave and convex surface to improve an appearance quality, a decorative molded product having the film adhered thereto, and a method of producing the decorative molded product.

BACKGROUND ART

In recent years, a decorative molding method by adhering a film to an interior or exterior component of a vehicle, an electronic appliance, miscellaneous goods, and so on is adopted. In this method, a solvent is not used as compared with painting, and therefore, a measure against exposure to the human body in a decorating process is not necessary, and reduction of an environmental load, an improvement in productivity such that it is possible to undergo collective decoration into various shapes, and an improvement in quality, such as reduction of paint stripping, can be expected.

Examples of a component of an adherend that is the subject to which such decorating molding is applied include molded articles made of a metal or a resin. In addition, in recent years, for the purpose of reducing the weight of a vehicle, fiber composite materials, such as carbon fiber composite materials, have been frequently used in place of the metal.

There is a case where some of components of an adherend have unintentional concaves and convexes. As for such concaves and convexes, for example, in the case of a metal, etc., there is exemplified a scar or scratch of rough polishing of a metal plate, and in the case of a resin molded product, there is exemplified a gate position or weld, or a joint during injection molding. In addition, in the fibrous composite materials, it is known that a fiber bundle or a texture structure of fibers, or the like appears on the surface. These concaves and convexes become a factor of worsening the appearance quality, and therefore, there was involved such a problem that after polishing the concaves and convexes, a process of undergoing decoration is necessary, and the productivity is lowered.

As a technology for dissolving the concaves and convexes of the adherend, in PTL 1, a resin film is laminated to reduce the concaves and convexes of a glass woven fabric and to reduce omission of printing to be caused due to the concaves and convexes during printing. In addition, PTL 2 proposes a technology of using resin sheets having a high modulus and a low modulus, respectively for a fiber-reinforced plastic containing a fiber-reinforced texture or knitted goods and a thermosetting resin, for the purpose of dissolving the concaves and convexes on a surface to be caused due to weaves or meshes. In addition, PTL 3 proposes a technology of using a low modulus resin sheet not having adhesiveness.

CITATION LIST

Patent Literature

PTL 1: JP 2014-117850 A
PTL 2: JP 4645334 B
PTL 3: JP 5406002 B

SUMMARY OF INVENTION

Technical Problem

PTL 1 and PTL 2 are effective against the concaves and convexes of a specified adherend. But, concaves and convexes having a variety of sizes exist in the scratches or on the joining surface, and hence, it is necessary to flatten such wide-range concaves and convexes. In addition, for example, an adherend working as an interior or exterior component of a vehicle has a three-dimensional shape, and it is necessary to undergo three-dimensional decorating molding. In addition, though the technology of PTL 3 is effective for the decorating method of pushing against a die as in press molding, a rubber elastic body film does not adhere to the adherend, and therefore, in order to adopt the method for vacuum molding or vacuum pressure molding, a step of separately applying a pressure-sensitive adhesive becomes necessary, so that the process becomes complicated.

An object of the present invention is to provide a film which can be decorated even against a three-dimensional shape, is excellent in moldability during decoration (adhesion) on an adherend, is able to reduce concaves and convexes with a variety of sizes which the adherend surface has, and makes an appearance quality favorable, a decorative molded product having the film, and a method of producing the decorative molded product.

Solution to Problem

The present inventors made extensive and intensive investigations. As a result, it has been found that the aforementioned problem can be solved by using a film in which when a highest temperature of glass transition temperatures of the film is designated as Tg [° C.], an elongation at break at a temperature T [° C.] of Tg to (Tg+50 [° C.]) or lower is 50% or more, and which has specified spatial frequency characteristics under a specified condition.

Specifically, the present invention relates to the following [1] to [12].

[1] A film including a layer containing a thermoplastic resin, wherein when a highest temperature of glass transition temperatures of the film is designated as Tg [° C.], a temperature T [° C.] at which an elongation at break is 50% or more exists in a range of Tg to (Tg+50 [° C.]), and when, with respect to concaves and convexes of an abrasive grain surface of a polyester film sheet having, as an abrasive grain, aluminum oxide having a grain size of 12 μm coated thereon, an amplitude relative to a spatial frequency f is designated as $A_1(f)$; with respect to concaves and convexes of a film surface when adhering the film to the abrasive grain surface at any temperature of the range of Tg to (Tg+50 [° C.]) and a pressure of 0.3 MPa, an amplitude relative to the spatial frequency f is designated as $A_2(f)$; and a ratio of $A_2(f)$ to $A_1(f)$ is designated as $\phi(f)=A_2M/A_1(f)$, a minimum value fc of spatial frequencies where $\phi(f)$ is 0.1 is 2.0 $mm^{-1}$ or less.

[2] The film as set forth in the above [1], wherein, with respect to a polypropylene resin sheet adhered at any temperature of the range of Tg to (Tg+50 [° C.]) and a pressure of 0.3 MPa, a peel strength in JIS K6854-1 is 5 N/25 mm or more.

[3] The film as set forth in the above [1] or [2], wherein, with respect to a methyl methacrylate resin sheet adhered at any temperature of the range of Tg to (Tg+50 [° C.]) and a pressure of 0.3 MPa, a peel strength in JIS K6854-1 is 5 N/25 mm or more.

[4] The film as set forth in any of the above [1] to [3], wherein the film has a substrate layer and an adhesive layer, and when a thickness of the substrate layer is designated as $t_1$ [m] and a modulus of the substrate layer at the temperature T [° C.] is designated as $E_1$ [Pa], S [Pa·m$^3$] expressed by $S=E_1 \times t_1^3$ is $1.2\times10^{-4}$ Pa·m$^3$ or more and $80\times10^{-4}$ Pa·m$^3$ or less.

[5] The film as set forth in the above [4], wherein when a thickness of the adhesive layer is designated as $t_2$ [m] and a modulus of the adhesive layer at the temperature T [° C.] is designated as $E_2$ [Pa], $t_2$ [m] is $5\times10^{-5}$ m or more and R expressed by $R=E_1/E_2$, wherein $E_1$ is a modulus of the substrate layer and $E_2$ is a modulus of the adhesive layer, is 7 or more.

[6] The film as set forth in the above [4] or [5], wherein a ratio ($t_1/t_2$) of the thickness $t_1$ [m] of the substrate layer and the thickness $t_2$ [m] of the adhesive layer is 0.1 or more and 3 or less.

[7] The film as set forth in any of the above [1] to [3], wherein the film has a substrate layer and an adhesive layer, and when a thickness of the substrate layer is designated as $t_1$ [m] and a modulus of the substrate layer at 130° C. is designated as $E_1'$ [Pa], S [Pa·m$^3$] expressed by $S=E_1' \times t_1^3$ is $1.2\times10^{-4}$ Pa·m$^3$ or more and $80\times10^{-4}$ Pa·m$^3$ or less.

[8] The film as set forth in the above [7], wherein when a thickness of the adhesive layer is designated as $t_2$ [m] and a modulus of the adhesive layer at 130° C. is designated as $E_2'$ [Pa], $t_2$ [m] is $5\times10^{-5}$ m or more and R expressed by $R=E_1'/E_2'$ is 7 or more.

[9] The film as set forth in the above [7] or [8], wherein a ratio ($t_1/t_2$) of the thickness $t_1$ [m] of the substrate layer and the thickness $t_2$ [m] of the adhesive layer is 0.1 or more and 3 or less.

[10] A decorative molded product including the film as set forth in any of the above [1] to [9] adhered to a surface of an adherend, wherein the surface of the adherend to which the film is adhered has a concave part or a convex part each having a width W of 0.1 μm or more and a height H of 0.02 μm or more, with a ratio (H/W) of the height H to the width W being 0.02 or more.

[11] A method of producing the decorative molded product as set forth in the above [10], including adhering the film to the adherend through vacuum molding and/or pressure molding.

[12] The production method as set forth in the above [11], wherein on adhering the film to the adherend through vacuum molding and/or pressure molding, an adhesive temperature is in the range of Tg to (Tg+50 [° C.]).

Advantageous Effects of Invention

In the film of the present invention, by adhering the film of the present invention to an adherend having concaves and convexes, such as a scratch, on a surface thereof, the concaves and convexes can be thoroughly reduced, and the surface can be flattened, and therefore, a decorative molded product with a favorable appearance quality can be obtained. In addition, decoration can be performed even on an adherend having a three-dimensional shape along the shape, and moldability is favorable.

DESCRIPTION OF EMBODIMENTS

[Film]

The film of the present invention is a film including a layer containing a thermoplastic resin, wherein when a highest temperature of glass transition temperatures of the film is designated as Tg [° C.], a temperature T [° C.] at which an elongation at break is 50% or more exists in a range of Tg to (Tg+50 [° C.]) (requirement 1-1), and when, with respect to concaves and convexes of an abrasive grain surface of a polyester film sheet having, as an abrasive grain, aluminum oxide having a grain size of 12 μm coated thereon, an amplitude relative to a spatial frequency f is designated as $A_1(f)$; with respect to concaves and convexes of a film surface when adhering the film to the abrasive grain surface at any temperature of the range of Tg to (Tg+50 [° C.]) and a pressure of 0.3 MPa, an amplitude relative to the spatial frequency f is designated as $A_2(f)$; and a ratio of $A_2(f)$ to $A_1(f)$ is designated as $\phi(f)=A_2(f)/A_1(f)$, a minimum value fc of spatial frequencies where $\phi(f)$ is 0.1 is 2.0 $mm^{-1}$ or less (requirement 1-2).

In the present invention, "3M Imperial Wrapping Film Sheet", manufactured by 3M Company (grain size: 12 μm, abrasive grain: aluminum oxide) (hereinafter also referred to simply as "wrapping film sheet") was used as the polyester film sheet having, as an abrasive grain, aluminum oxide having a grain size of 12 μm coated thereon.

Hereunder, what the film is adhered to the adherend is also referred to as "decoration" or "decorative molding", and an adhered material having the film adhered to the adherend is also referred to as "decorative molded product". In addition, it should be construed that the adhesion also includes contact bonding and fusion.

When the film of the present invention is adhered onto an adherend having a surface shape of every sort, a decorative molded product with a high appearance quality can be obtained. In this way, the film of the present invention can be used as a film for decoration (also referred to as "decorative film").

Figure 1:
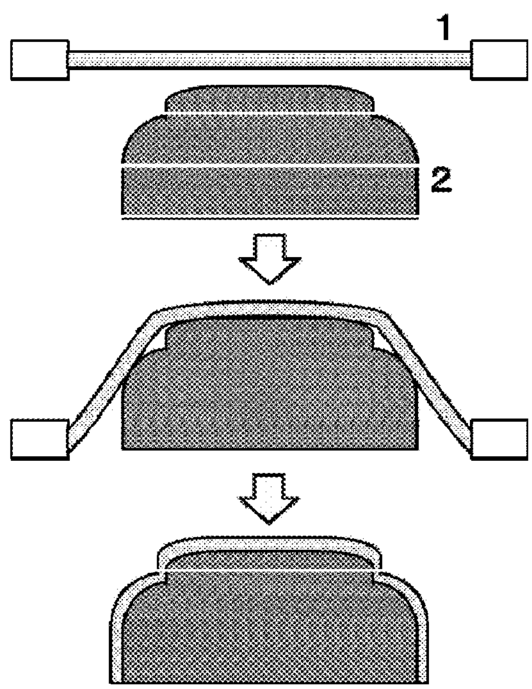
FIG. 1 is an explanatory view explaining an example of a decorating method of the film of the present invention.

FIG. 1 is an explanatory view explaining an example of a decorating method of the film of the present invention. FIG. 1 shows a process of adhering a film 1 of the present invention to an adherend 2 having a three-dimensional shape while elongating. In order to conform to the three-dimensional shape, the film of the present is required to have a fixed elongation at break without causing breakage.

Figure 2:
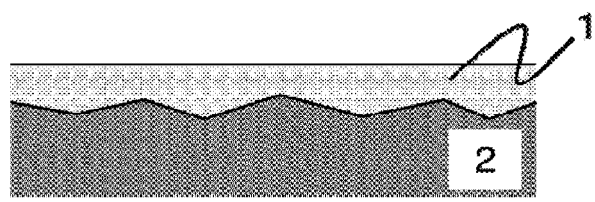
FIG. 2 is an explanatory view showing an embodiment after adhering the film of the present invention to an adherend.

FIG. 2 shows an embodiment after adhering the film of the present invention to the adherend and is a view explaining a function of the film of the present invention. By subjecting the adherend 2 having a concave and convex surface to decorative molding by the film of the present invention, it is understood that the surface of a member after decoration can be flattened, and a high appearance quality can be obtained.

A scar or scratch of rough polishing of a metal, etc., a gate position or weld, or a joint during injection molding of a resin molded product, a fiber bundle or a texture structure of fibers of a fiber composite material, and so on have concaves and convexes of a variety of sizes. One of these is originated from a concave and convex structure. For example, between a single sharp concave and convex and a smooth concave and convex, even if the width of the concave and convex is identical, the appearance or a degree at which the concave and convex can be flattened at the time of decorating the film is different. In addition, another is originated from irregularity of alignment of a concave and a convex. Supposing that a plurality of identical concaves and convexes are aligned, the appearance or the influence by the film is different between the case where the concaves and convexes are regularly aligned and the case where the concaves and convexes are irregularly aligned.

For example, in the case where only relatively large cyclical concaves and convexes (undulations) exist, gloss exists in the appearance of the surface. On the other hand, in the case where only small cyclical concaves and convexes exist, light is scattered due to the fine concaves and convexes, so that gloss is lost. In addition, though in the case where the film is decorated, the fine concaves and convexes are flattened, there is a possibility that the film itself is bent, so that the large cyclical concaves and convexes remain without being flattened. In this way, the influence varies with the cycle of concaves and convexes.

In order to adjust and understand the influence which the size or cycle of these concaves and convexes gives to the appearance or the film, a method of subjecting the shape of the concave and convex of the surface to a Fourier transform and comparing it in terms of a spatial frequency is suitable (see, for example, JP 7-128037 A). According to the Fourier transform, the concave and convex shape of the surface can be expressed through superposition of sinusoidal waves for every cycle (spatial frequency). In this way, the influence may be considered while separating the small cycle and the large cycle from each other.

Figure 3:
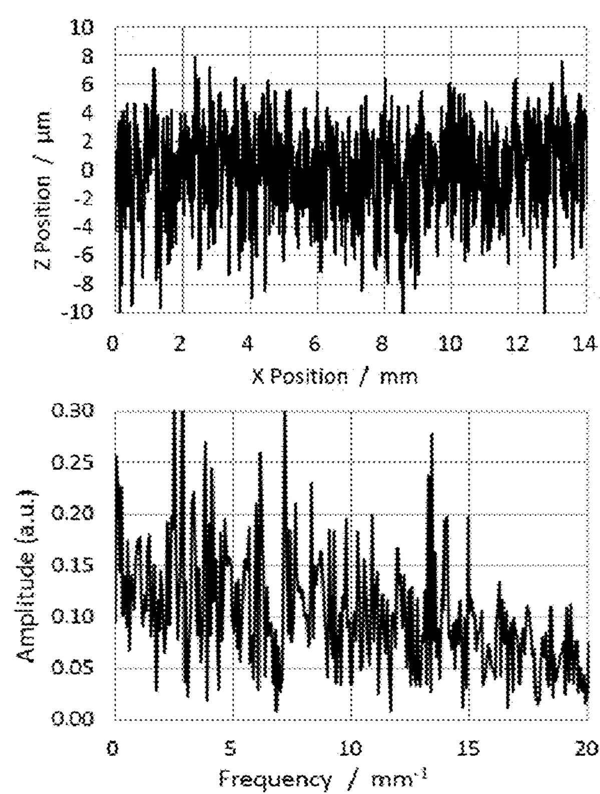
FIG. 3 is a graph showing the measurement result of surface concaves and convexes of a wrapping film sheet and frequency characteristics of the surface concaves and convexes.
Figure 4:
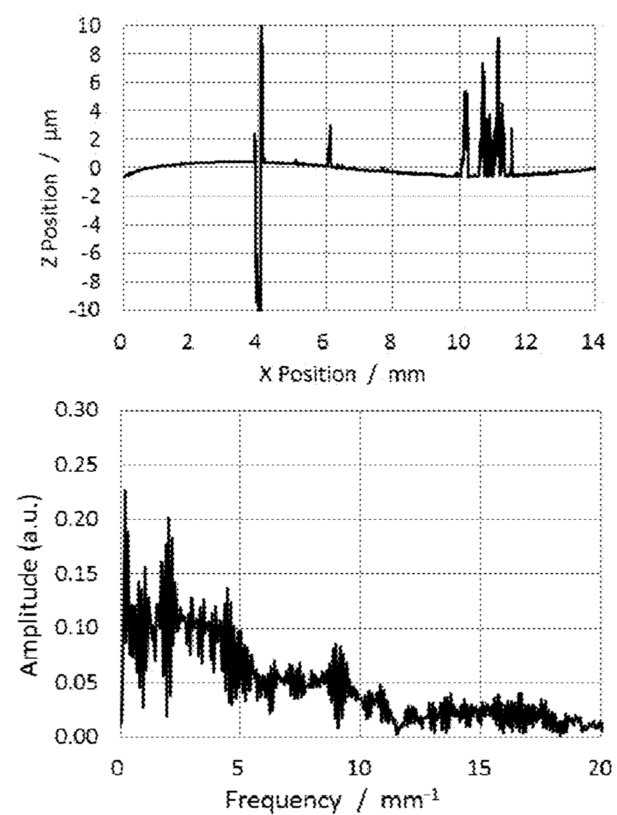
FIG. 4 is a graph showing the measurement result of surface concaves and convexes of an adherend having a single defect and frequency characteristics of the surface concaves and convexes.

FIG. 3 shows a shape of a surface of a wrapping film sheet ("3M Imperial Wrapping Film Sheet", manufactured by 3M Company, grain size: 12 μm. abrasive grain: aluminum oxide) as one example of an adherend; and frequency characteristics in the case of subjecting this surface shape to a Fourier transform. The concaves and convexes, such as grains, which exist on the surface of the wrapping film sheet have concaves and convexes of a large cycle and concaves and convexes of a small cycle. In addition, FIG. 4 shows a shape of a surface in the case where a single defect exists as one example of an adherend; and frequency characteristics in the case of subjecting this surface shape to a Fourier transform. The defect which exists alone, or the like also has concaves and convexes in a wide range of the large cycle to the small cycle. In this way, even in concaves and convexes, such as grains, or even in a single defect, components of various cycles (frequencies) exist in the concaves and convexes.

Flattening of the surface of the adherend by the film can be expressed according to the following equation in terms of a ratio of the concave and convex of the surface of the adherend before decoration and the surface concave and convex after decoration.

$$\phi(f)=A_2(f)/A_1(f)$$

Here, $\phi(f)$ is a damping ratio of the concave and convex by the film; $A_1(f)$ is the concave and convex of the surface of the adherend; and $A_2(f)$ is the surface concave and convex after decorating the adherend by the film. By adopting the $\phi(f)$, how the surface can be flattened relative to the various concaves and convexes can be known. Furthermore, the $\phi(f)$ is large in a region where the spatial frequency f is small, whereas it is small in a region where the f is large. It is meant that the smaller the $\phi(f)$, namely the smaller the $A_2(f)$ relative to the $A_1(f)$, the larger the effect for surface flattening of the film.

Here, in the case where the $\phi(f)$ is 1/10, namely a minimum value fc of spatial frequencies where the $\phi(f)$ is 0.1 is 2.0 $mm^{-1}$ or less (requirement 1-2), it is possible to flatten the defect or surface concave and convex to improve the appearance quality. By lowering the concave and convex having a frequency of 2.0 $mm^{-1}$ (cycle: 0.5 mm) to 1/10 or less, a glossy feeling is obtained, and a high appearance quality can be obtained. In the case where the fc is larger than 2.0 $mm^{-1}$, concaves and convexes smaller than the cycle of 0.5 mm cannot be smoothed, so that the appearance quality is worsened such that a scratch is visualized, or the gloss is lost.

In order to acquire such $\phi(f)$, it is necessary to measure $A_1(f)$ and $A_2(f)$ relative to concaves and convexes having a variety of cycles. The wrapping film sheet as shown in FIG. 3 has a variety of cycles and is suitable for derivation of $\phi(f)$. Accordingly, in the present invention, the $\phi(f)$ is determined by using the wrapping film sheet as shown in FIG. 3.

On determining the aforementioned fc, a condition under which the wrapping film sheet and the film are adhered to each other is the same as in the matters mentioned in the "Moldability Evaluation" described in the section of Examples.

Figure 5:
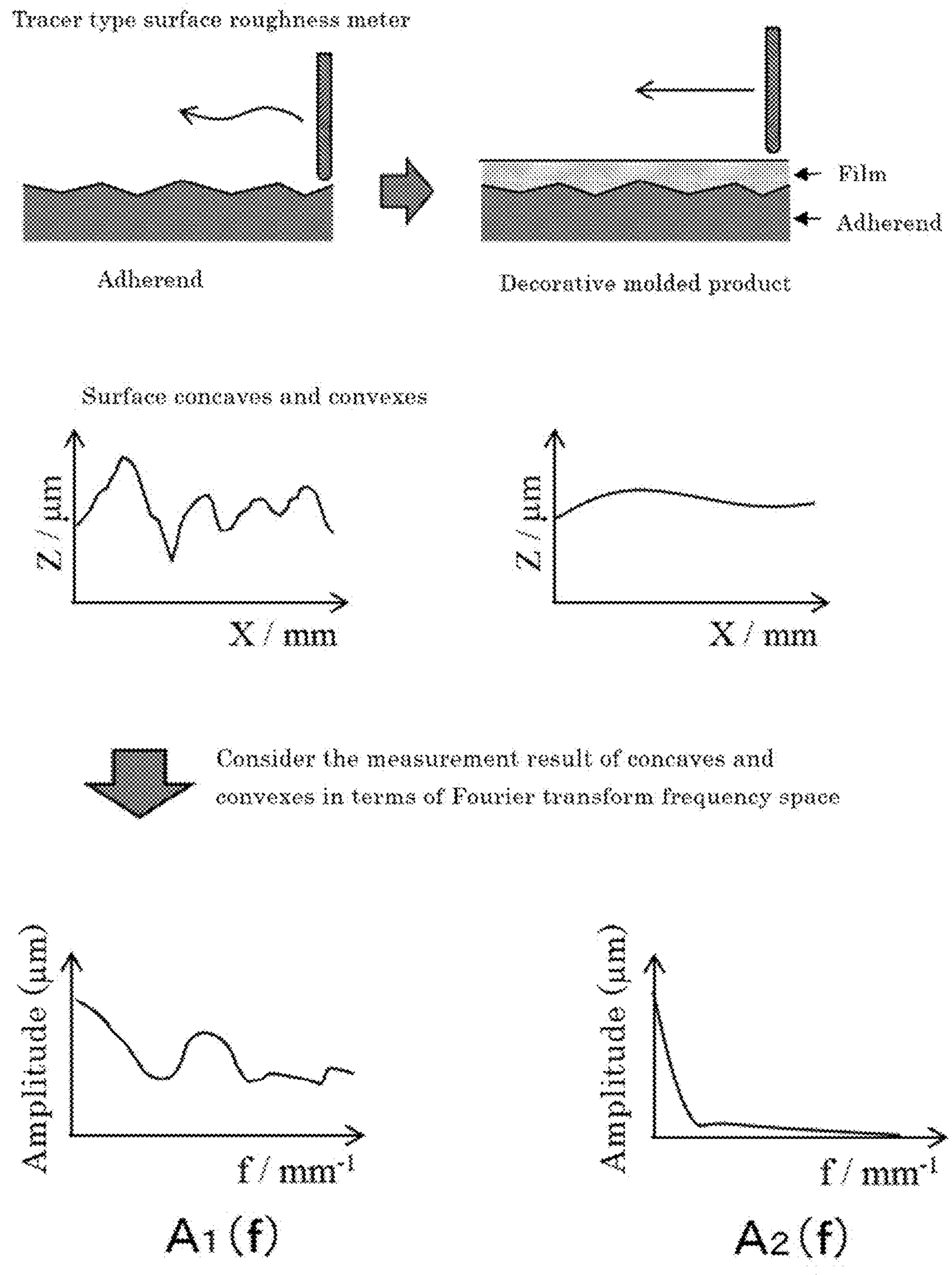
FIG. 5 is an explanatory drawing explaining a method of determining $A_1(f)$ (left drawings) and $A_2(f)$ (right drawings).

The amplitudes $A_1(f)$ and $A_2(f)$ relative to the spatial frequency f can be obtained by measuring the surface concaves and convexes of the abrasive grain surface of the wrapping film sheet and the film adhered onto the abrasive grain surface of the wrapping film, respectively and subjecting the results to a Fourier transform (see FIG. 5). The surface concaves and convexes can be measured by the method using a tracer type surface roughness meter, as described in the section of Examples as mentioned later. The Fourier transform can be simply performed with a spreadsheet software by adopting the fast Fourier transform.

As for the film of the present invention, from the viewpoint of making the appearance quality favorable and the viewpoint of following the film even against the three-dimensional shape, the minimum value fc of spatial frequencies where $\phi(f)$ as measured using the wrapping film sheet is 0.1 is 2.0 $mm^{-1}$ or less, preferably 1.8 $mm^{-1}$ or less, more preferably 1.6 $mm^{-1}$ or less, still more preferably 1.3 $mm^{-1}$ or less, and yet still more preferably 1.0 $mm^{-1}$ or less, and the fc is preferably 0.01 $mm^{-1}$ or more, and more preferably 0.05 $mm^{-1}$ or more. What the fc is 0.05 $mm^{-1}$ or more means that the flattening effect against the concaves and convexes having a cycle of 20 mm or more is low, namely the followability to a three-dimensional stereostructure is high.

Furthermore, when the f is 3 $mm^{-1}$ (the cycle is about 0.3 mm), the damping ratio $\phi(f)$ is preferably 0.08 or less. When the concave and convex in this region is reduced, the gloss is favorable, and the appearance quality is significantly improved. It is better that the damping ratio in this region is small. From the viewpoint of obtaining a surface with more favorable gloss on decorating the film, when the f is 3 $mm^{-1}$, the damping ratio $\phi(f)$ is more preferably 0.05 or less.

Furthermore, from the viewpoint of making it possible to subject the film of the present invention to decorative molding on adherends having various shapes without being broken, it is required that when a highest temperature of glass transition temperatures of the film is designated as Tg [° C.], a temperature T [° C.] at which an elongation at break is 50% or more exists in a range of Tg to (Tg+50 [° C.]) (requirement 1-1). It is preferred that the film of the present invention has a temperature T1 at which the elongation at break is 100% or more in the range of Tg to (Tg+50 [° C.]), and it is more preferred that the film of the present invention has a temperature T2 at which the elongation at break is 300% or more in the range of Tg to (Tg+50 [° C.]).

The temperature T is an optimum temperature for processing of the film. When the elongation at break on processing the film at the temperature T is smaller than 50%, there is a case where the decoration cannot be performed on the three-dimensional shape, and the film is broken. So long as the temperature T [° C.] at which the elongation at break is 50% or more exists in the range of Tg to (Tg+50 [° C.]), it is not necessary to heat the film to an excessively high temperature on processing; deformation of the adherend due to heat can be prevented from occurring; the film is hardly fused; and the appearance of the film is improved.

The elongation at break of the film of the present invention can be measured with a tensile tester. The elongation at break can be determined from a length of the film broken when placed within a thermostat together with a tool of the tensile tester and then drawn at a predetermined temperature.

The glass transition temperature of the film can be determined by the method described in the section of Examples.

The film satisfying the aforementioned requirement 1-1 and requirement 1-2 is excellent in moldability on a concave and convex adherend, and when adhered to the adherend, the appearance quality can be made favorable.

Furthermore, by evaluating whether or not the film satisfying the requirement 1-1 satisfies the requirement 1-2 on a basis of such findings, it is also possible to promptly sort a film which is excellent in decorative molding.

The film of the present invention is required to have a layer containing a thermoplastic resin from the viewpoint of heating the film to adhere it to the adherend. The layer containing a thermoplastic resin is a layer containing the thermoplastic resin in an amount of preferably 50% by mass or more, more preferably 80% by mass or more, still more preferably 90% by mass or more, and yet still more preferably 100% by mass. Examples of the thermoplastic resin include an ABS-based resin, an acrylic resin, such as a PMMA resin, a polystyrene-based resin, a polycarbonate-based resin, a polyolefin-based resins, such as polypropylene, a polyester-based resin, such as polyethylene terephthalate (PET) and polybutylene terephthalate (PBT), various polyamide-based resins, and a cycloolefin resin (COP resin).

The film of the present invention is preferably a film having a substrate layer and an adhesive layer from the viewpoint of making the moldability during decorative molding and the appearance quality of the surface after decorative molding favorable. Preferred materials constituting the substrate layer and the adhesive layer are mentioned later.

The substrate layer is preferably one in which when a thickness of the substrate layer is designated as $t_1$ [m], and a modulus of the substrate layer at the temperature T [° C.] or 130° C. is designated as $E_1$ or $E_1'$ [Pa], respectively, S [$Pa \cdot m^3$] expressed by $S=E_1 \times t_1^3$ or $S=E_1' \times t_1^3$ is $1.2 \times 10^{-4}$ $Pa \cdot m^3$ or more and $80 \times 10^{-4}$ $Pa \cdot m^3$ or less (requirement 2), from the viewpoint of making the moldability during decorative molding and the appearance quality of the surface after decorative molding favorable. The temperature T [° C.] at which the elongation at break of the film is 50% or more in the range of Tg to (Tg+50 [° C.]) (requirement 1-1) is usually not a single temperature but exists as a temperature with a fixed width. However, with respect to the temperature T [° C.] at an arbitrary point satisfying the requirement 1-1, the requirement 2 has only to be satisfied.

Here, a derivation method of the requirement 2 of the substrate layer is explained.

Figure 6:
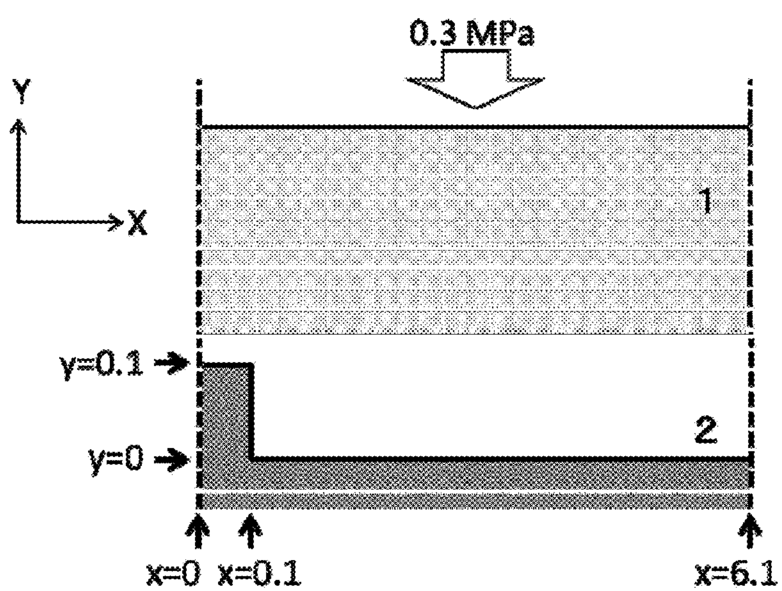
FIG. 6 is an explanatory view of an xy plane of an adherend used in simulation.

First of all, simulation by structural analysis was carried out, thereby confirming whether or not the requirement 1-2 can be reproduced. In the case of adhering the film to an adherend having concaves and convexes using a structural analysis software ("MARC", manufactured by MSC Software Co., Ltd.), what kind of concaves and convexes is revealed on the surface of the film was simulated. The simulation was performed in a two-dimensional manner on an xy plane as shown in FIG. 6, and a shape expressed by the following equation was considered as the concave and convex of the adherent, to determine a damping ratio relative to the concave and convex of the adherent.

$$y[\mathrm{mm}] = \begin{cases} 0.1 (0 \le x[\mathrm{mm}] \le 0.1) \\ 0 (0.1 \le x[\mathrm{mm}] \le 6.1) \end{cases} \quad \text{[Math. 1]}$$

Deformation of a film when a temperature of the adherend was set to 60° C., a temperature of the film was set to 130° C., and the film gave a pressure of 0.3 MPa for vacuum pressure molding for 0.1 seconds was simulated. When the adherend was not deformed, and the film came into contact with the adherend, heat transfer was set such that the contact surface of the film with the adherend became the temperature of the adherend, and a temperature change of the interior of the film was taken into consideration for thermal conduction. In addition, a boundary condition under which the deformation, pressure, and temperature were identical was set while considering x=0 mm and x=6.1 mm as a symmetric condition, thereby acquiring concaves and convexes of the film after deformation.

Figure 7:
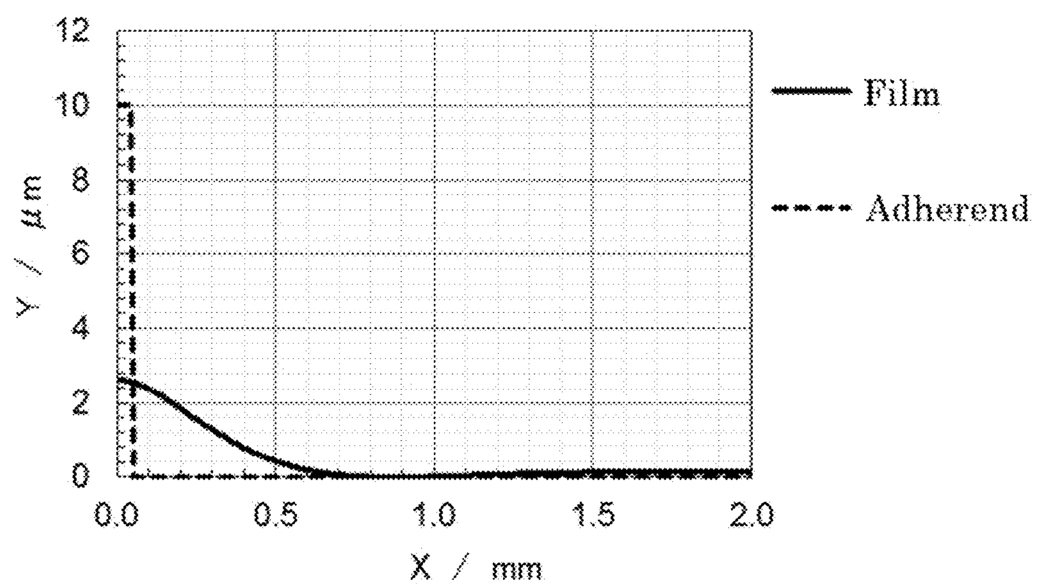
FIG. 7 shows the simulation result of the surface concaves and convexes on decorating a film on an adherend.

A laminate composed of a substrate layer and an adhesive layer was prepared for the film, and the simulation was performed under a condition under which the substrate layer had a modulus at 130° C. of 140 MPa and a thickness of $12\times10^{-5}$ m, and the adhesive layer had a modulus at 130° C. of 0.65 MPa and a thickness of $6\times10^{-5}$ m. The simulation result is shown in FIG. 7. As compared with the concaves and convexes of the adherend, the concaves and convexes on the film after decoration becomes smooth.

Since the concaves and convexes of the simulated adherend have a rectangular shape with a narrow width, they have components of a variety of frequencies similar to the single scar shown in FIG. 4. Accordingly, by collecting a damping ratio of each of the frequency components of the concaves and convexes on the film after decoration relative to the concaves and convexes of this adherend, damping of the concaves and convexes by the film can be compared.

In the simulation, since the symmetric condition at x=0 mm and x=6.1 mm was adopted, a cyclic structure is set as a premise. In order to undergo the Fourier transform, the result of FIG. 7 was symmetrically aligned for 13 individuals to collect 4,096 data, which were then subjected to the fast Fourier transform (FFT) with a spreadsheet software. By designating the concave and convex of the adherend after the FFT as $A_1(f)$ and the concave and convex of the film surface after the decoration as $A_2(f)$, respectively, the damping ratio $\phi(f)$ of the concave and convex was calculated.

Next, on the assumption that four points before and after each of the damping ratios became 1/10 ($\phi(f)=0.1$) are designated as $(f_1, \phi_1)$, $(f_2, \phi_2)$, $(f_3, \phi_3)$, and $(f_4, \phi_4)$, and these four points can be approximated in terms of an exponential function, the approximation was performed by adopting the least squares method.

$$\phi=a\cdot\exp(b\cdot f)$$

In the aforementioned equation, a and b are each a fitting parameter when determining in terms of an exponential function. By substituting $\phi=0.1$ for the aforementioned approximation equation, fc was determined. As a result, fc was found to be 1.8. A graph of the result of simulation is shown in FIG. 8.

Meanwhile, using a film having the same constitution as in the simulation, namely a film composed of a laminate of the substrate layer and the adhesive layer, in which the substrate layer has a modulus at 130° C. of 140 MPa and a thickness of $12\times10^{-5}$ m, and the adhesive layer has a modulus at 130° C. of 0.65 MPa and a thickness of $6\times10^{-5}$ m (the film used in Example 1 as mentioned later), a test for moldability evaluation on the adherend was performed (actual test). "3M Imperial Wrapping Film Sheet", manufactured by 3M Company (grain size: 12 μm, abrasive grain: aluminum oxide) (hereinafter also referred to simply as "wrapping film sheet") was used as the adherend, to determine the fc by the method described in the section of Examples.

Figure 8:
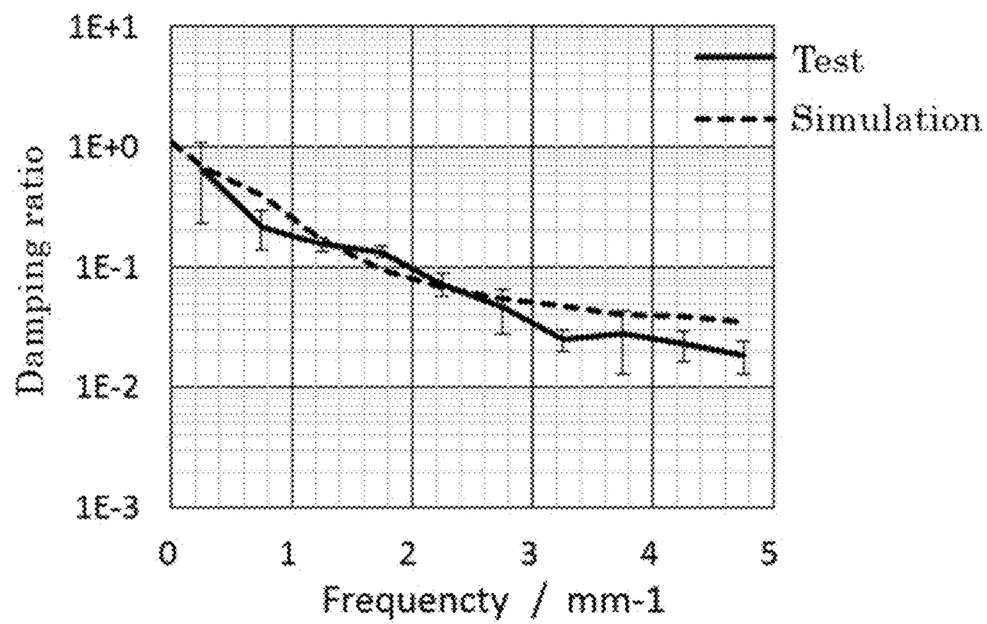
FIG. 8 is a graph showing a relation between a frequency and a damping ratio obtained by simulation and actual measurement test.

The result of the simulation and the result of the actual test were compared in FIG. 8. In the simulation, the fc was 1.8, whereas in the result of actual test, the fc was 1.9, and the both were well coincident with each other. In view of this fact, it was noted that the test result can be reproduced by this simulation. In addition, by using the frequency component and collecting a damping ratio $\phi(f)$ of the concave and convex relative to the adherend, it was noted that the change of the concave and convex by the film can be grasped without relying upon the size of the shape of the adherend.

In deriving the fc in the requirement 1-2, the result of the actual test but not the result of the aforementioned simulation is adopted. That is, on the occasion of using a polyester film sheet having, as an abrasive grain, aluminum oxide having a grain size of 12 μm coated thereon and adhering a film to the concaves and convexes on the abrasive grain surface, the value measured by the method described in the section of Examples is designated as fc.

Figure 9:
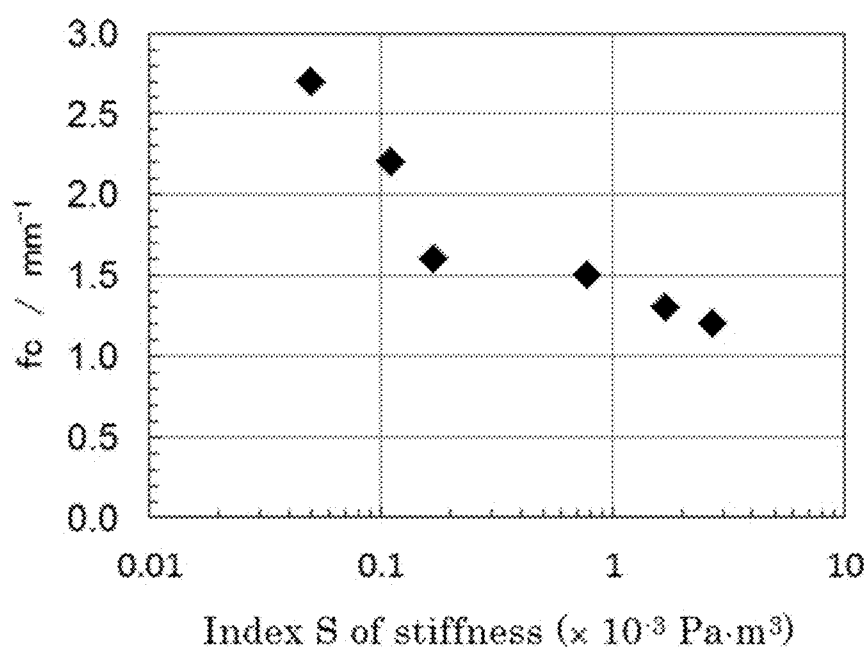
FIG. 9 is a graph showing a relation between S and fc obtained by simulation.

Subsequently, when a thickness of the substrate layer is designated as $t_1$ [m], and a modulus of the substrate layer at the temperature T [° C.] or 130° C. is designated as $E_1$ or $E_1'$ [Pa], respectively, the technical meanings of S [$Pa\cdot m^3$] expressed by $S=E_1\cdot t_1^3$ or $S=E_1'\times t_1^3$ are explained. The S [$Pa\cdot m^3$] is an index of stiffness. FIG. 9 shows the result obtained by simulating the influence of the index S of stiffness of the substrate layer against the fc in the case of setting the molding temperature to 130 [° C.], the modulus of the adhesive layer at this temperature to 0.6 [MPa], and the thickness of the adhesive layer to $1\times10^{-4}$ [m], respectively. It was noted that when the S as the index of stiffness becomes large, the fc is reduced, and the decorative surface is smoothed. This may be considered to reside in the matter that when the S becomes large, the film itself is hardly bent.

In the light of the above, from the viewpoint of making the appearance quality of the surface after the decorative molding favorable, it was decided that one having an S [$Pa\cdot m^3$] of $1.2\times10^{-4}$ $Pa\cdot m^3$ or more and $80\times10^{-4}$ $Pa\cdot m^3$ or less is preferred (requirement 2). When the S falls within the aforementioned range, the requirement 1-2 is satisfied.

In the aforementioned simulation, since the molding temperature of the film was set to 130° C., $E_1'$ [Pa] was adopted as the modulus of the substrate layer at 130° C. But, as mentioned above, the aforementioned temperature T at which the elongation at break of the film is 50% or more is optimum for molding processing of the film, and therefore, in the case of performing the molding at the molding temperature in the range satisfying the temperature T, it is preferred that the measurement temperature of the modulus $E_1$ [Pa] of the substrate layer is the molding temperature. This is because that the modulus of the substrate layer at the molding temperature is important.

From the viewpoint of making the moldability during decorative molding and the appearance quality of the surface after decorative molding more favorable, the S [$Pa\cdot m^3$] is more preferably $2\times10^{-4}$ or more, and still more preferably $2.3\times10^{-4}$ or more. From the viewpoint of followability to a three-dimensional shape, the S [$Pa\cdot m^3$] is more preferably $50\times10^{-4}$ or less, and still more preferably $30\times10^{-4}$ or less.

Although the thickness $t_1$ [m] of the substrate layer is not particularly limited, since it influences the index S of stiffness, from the viewpoint of making the moldability during decorative molding and the appearance quality of the surface after decorative molding favorable, the thickness $t_1$ [m] is preferably $5\times10^{-5}$ m or more, and more preferably $10\times10^{-5}$ m or more. In addition, from the viewpoints of followability to a three-dimensional shape and productivity, the thickness $t_1$ [m] is preferably $70\times10^{-5}$ m or less, more preferably $60\times10^{-5}$ m or less, and still more preferably $50\times10^{-5}$ m or less.

Although the modulus of the substrate layer is not particularly limited, since it influences the index S of stiffness, from the viewpoint of making the moldability during decorative molding and the appearance quality of the surface after decorative molding favorable, the modulus of the substrate layer at 130° C. or an arbitrary temperature T [° C.] satisfying the requirement 1-1 is preferably 1 MPa or more, more preferably 10 MPa or more, and still more preferably 100 MPa or more. From the viewpoints of followability to a three-dimensional shape and productivity, the modulus of the substrate layer is preferably 500 MPa or less, more preferably 300 MPa or less, and still more preferably 200 MPa or less.

As for the adhesive layer, one in which when a thickness of the adhesive layer is designated as $t_2$ [m], and a modulus of the adhesive layer at the temperature T [° C.] is designated as $E_2$ [Pa], $t_2$ [m] is $5\times10^{-5}$ m or more (requirement 3-1), and R expressed by $R=E_1/E_2$ is 7 or more (requirement 3-2) is preferred from the viewpoint of making the moldability during decorative molding and the appearance quality of the surface after decorative molding favorable.

The temperature T [° C.] at which the elongation at break of the film is 50% or more in the range of Tg to (Tg+50 [° C.]) (requirement 1-1) is usually not a single temperature but exists as a temperature with a fixed width. However, with respect to the temperature T [° C.] at an arbitrary point satisfying the requirement 1-1, the requirement 3-2 has only to be satisfied.

Here, the derivation methods of the aforementioned requirement 3-1 and requirement 3-2 of the adhesive layer are explained. The verification was performed by adopting the same simulation as mentioned above.

Figure 10:
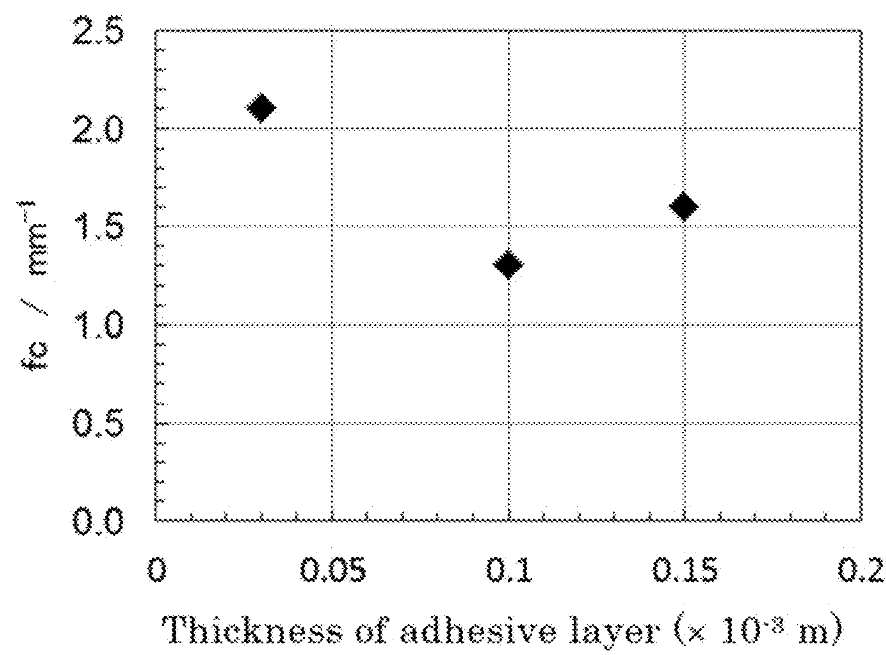
FIG. 10 is a graph showing a relation between a thickness of an adhesive layer and fc obtained by simulation.

FIG. 10 shows the result obtained by simulating the influence of the thickness $t_2$ [m] of the adhesive layer against the fc in the case of setting the molding temperature to 130 [° C.], the modulus of the substrate layer at this temperature to 110 [MPa], the thickness of the substrate layer to $2.5\times10^{-4}$ [m], and the modulus of the adhesive layer to 0.6 [MPa], respectively. When the thickness of the adhesive layer is large, the fc becomes small, and the decorative surface can be smoothed. This may be considered to reside in the matter that when the thickness of the adhesive layer is large, the concaves and convexes can be absorbed by the adhesive layer.

In the light of the above, from the viewpoint of making the appearance quality of the surface after the decorative molding favorable, it was decided that one having a $t_2$ [m] of $5\times10^{-5}$ m or more is preferred (requirement 3-1). When the $t_2$ falls within the aforementioned range, the requirement 1-2 is satisfied.

From the viewpoint of making the moldability during decorative molding and the appearance quality of the surface after decorative molding more favorable, the thickness $t_2$ [m] of the adhesive layer is more preferably $7\times10^{-5}$ m or more, and still more preferably $8\times10^{-5}$ m or more. In addition, from the viewpoints of followability to a three-dimensional shape and productivity, the $t_2$ [m] is preferably $70\times10^{-5}$ m or less, more preferably $50\times10^{-5}$ m or less, and still more preferably $40\times10^{-5}$ m or less.

Figure 11:
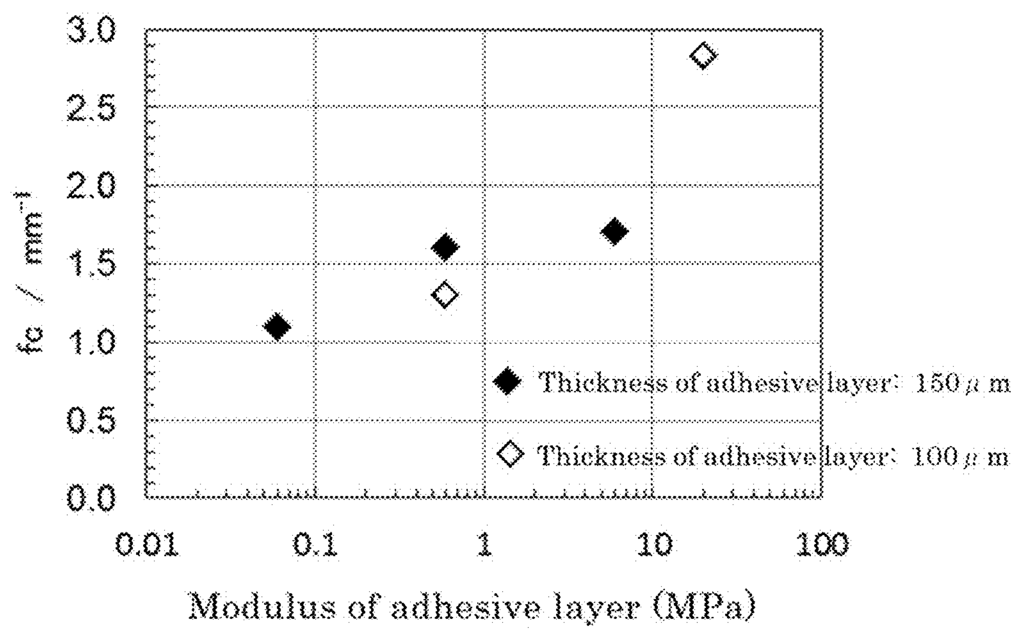
FIG. 11 is a graph showing a relation between a modulus of an adhesive layer and fc obtained by simulation.

FIG. 11 shows the result obtained by simulating the influence of the modulus $E_2$ [Pa] of the adhesive layer against the fc in the case of setting the molding temperature to 130 [° C.], the modulus of the substrate layer at this temperature to 110 [MPa], the thickness of the substrate layer to $2.5\times10^{-4}$ [m], and the thickness of the adhesive layer to $1.0\times10^{-4}$ [m] or $1.5\times10^{-4}$ [m], respectively. When the modulus of the adhesive layer is small, the fc becomes small, and the decorative surface can be thoroughly smoothed. This may be considered to reside in the matter that when the modulus of the adhesive layer is small, the concaves and convexes can be absorbed by the soft adhesive layer.

Although the modulus $E_2$ [Pa] of the adhesive layer is not particularly limited, from the viewpoint of making the moldability during decorative molding and the appearance quality of the surface after decorative molding favorable, the modulus $E_2$ [Pa] at 130 [° C.] is preferably 10 MPa or less, more preferably 5 MPa or less, and still more preferably 1 MPa or less. In addition, from the viewpoint of making the handling during decorative molding or transportation of the film easy, the modulus $E_2$ [Pa] is preferably 0.1 MPa or more, more preferably 0.3 MPa or more, and still more preferably 0.5 MPa or more.

With respect to the influence of R expressed by $R=E_1'/E_2'$ in the case of designating the modulus of the substrate layer at 130 [° C.] as $E_1'$ [MPa] and the modulus of the adhesive layer at 130 [° C.] as $E_2'$ [MPa], respectively, the verification was performed by adopting the same simulation as mentioned above.

Figure 12:
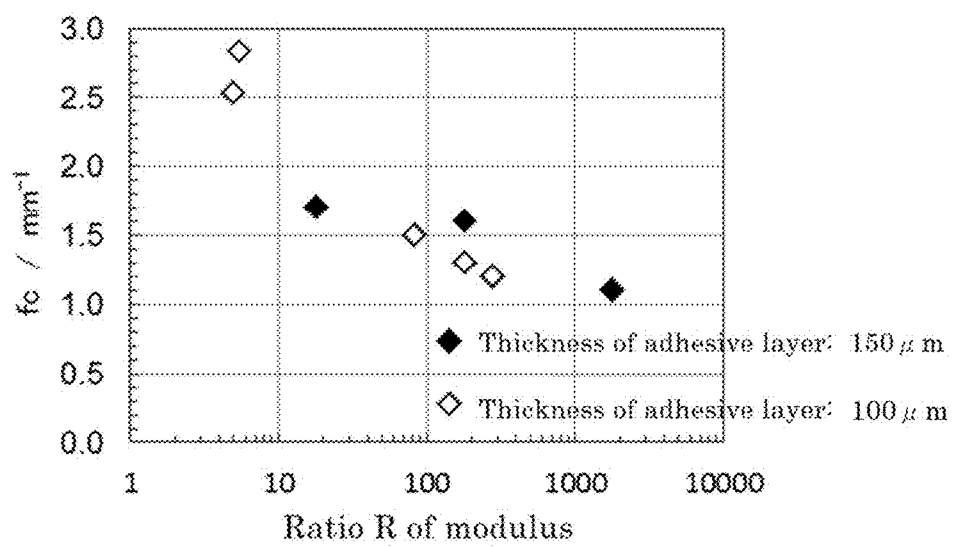
FIG. 12 is a graph showing a relation between a ratio R of a modulus and fc obtained by simulation.

FIG. 12 shows the result obtained by simulating the influence of the R expressed by $R=E_1'/E_2'$ against the fc in the case of setting the molding temperature to 130 [° C.], the modulus of the substrate layer at this temperature to 110 [MPa], the thickness of the substrate layer to $2.5\times10^{-4}$ [m], and the thickness of the adhesive layer to $1.0\times10^{-4}$ [m] or $1.5\times10^{-4}$ [m], respectively. In the case where the R is large, since the modulus ($E_2'$) of the adhesive layer is thoroughly small relative to the modulus ($E_1'$) of the substrate layer, and the concaves and convexes of the adherend can be thoroughly absorbed by the adhesive layer, the fc is small, and the surface is smoothed.

In the light of the above, from the viewpoint of making the appearance quality of the surface after the decorative molding favorable, it was decided that one having an R of 7 or more is preferred (requirement 3-2). When the R falls within the aforementioned range, at the time when the film is adhered to the adherend, the adhesive layer pressed on the substrate layer is deformed, whereby both the favorable adhesiveness to the adherend and the favorable smoothness of the surface can be made compatible with each other. When the R falls within the aforementioned range, the requirement 1-2 is satisfied.

In the aforementioned simulation, since the molding temperature of the film was set to 130° C., $E_2'$ [Pa] was adopted as the modulus of the adhesive layer at 130° C. But, as mentioned above, the aforementioned temperature T at which the elongation at break of the film is 50% or more is optimum for molding processing of the film, and therefore, in the case of performing the molding at the aforementioned temperature T, it is necessary to set the measurement temperature of the modulus $E_2$ [Pa] of the adhesive layer to the aforementioned temperature T. This is because that the modulus of the adhesive layer at the molding temperature is important.

From the aforementioned viewpoint, the R is more preferably 15 or more, still more preferably 20 or more, yet still more preferably 100 or more, and yet still more preferably 200 or more.

On the other hand, from the standpoints of followability to a three-dimensional shape, handling properties during decorative molding or transportation of the film, and so on, the R is preferably 10,000 or less, more preferably 2,000 or less, and still more preferably 1,000 or less.

In this way, by forming the film in a multilayered constitution of the substrate layer and the adhesive layer and dividing the roles into absorption and smoothing of the concaves and convexes, the surface after decoration can be smoothed.

From the viewpoint of making the moldability during decorative molding and the appearance quality of the surface after decorative molding favorable, the ratio $t_1/t_2$ of the thickness $t_1$ [m] of the substrate layer and the thickness $t_2$ [m] of the adhesive layer is preferably 0.1 or more, more preferably 0.3 or more, and still more preferably 0.5 or more. From the viewpoints of handling properties during decorative molding or transportation of the film, adhesiveness, and so on, the ratio $t_1/t_2$ is preferably 3 or less, more preferably 1 or less, and still more preferably 0.7 or less.

<Constituent Materials of Substrate Layer>

As for the substrate layer, for example, a polystyrene resin, a polyvinyl chloride resin, an acrylonitrile styrene resin, an acrylonitrile butadiene styrene resin, a polycarbonate resin, and a methacrylic resin can be used. Above all, from the viewpoints of transparency, weather resistance, surface glossiness, and scratch resistance and the viewpoint of obtaining a film having an fc of 2.0 $mm^{-1}$ or less, the substrate layer is preferably constituted of a methacrylic resin, and more preferably constituted of a methacrylic resin composition containing a methacrylic resin and an elastic body. A total amount of the methacrylic resin and the elastic body in the methacrylic resin composition is preferably 80% by mass or more, more preferably 90% by mass or more, and still more preferably 100% by mass.

The methacrylic resin is preferably one having a structural unit derived from methyl methacrylate in an amount of 80% by mass or more. So long as the methacrylic resin is such a methacrylic resin, commercially available products may be used. Examples of the methacrylic resin include "PARAPET H1000B" (MFR: 22 g/10 min (230° C., 37.3 N)), "PARAPET OF" (MFR: 15 g/10 min (230° C., 37.3 N)), "PARAPET EH" (MFR: 1.3 g/10 min (230° C., 37.3 N)), "PARAPET HRL" (MFR: 2.0 g/10 min (230° C., 37.3 N)), "PARAPET HRS" (MFR: 2.4 g/10 min (230° C., 37.3 N)), and "PARAPET G" (MFR: 8.0 g/10 min (230° C., 37.3 N)) (all of which are manufactured by Kuraray Co., Ltd.).

Examples of the elastic body include a butadiene-based rubber, a chloroprene-based rubber, a block copolymer, and a multilayered structure, and these may be used either alone or in combination. Of these, a block copolymer or a multilayered structure is preferred from the viewpoints of transparency, impact resistance, and dispersibility.

The block copolymer is preferably an acrylic block copolymer, and for example, an acrylic block copolymer having a methacrylic acid ester polymer block (g1) and an acrylic acid ester polymer block (g2) is preferred.

The methacrylic acid ester polymer block (g1) is one in which a main constituent unit thereof is a structural unit derived from a methacrylic acid ester. Examples of such a methacrylic acid ester include methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, phenyl methacrylate, benzyl methacrylate, phenoxyethyl methacrylate, 2-hydroxyethyl methacrylate, 2-methoxyethyl methacrylate, glycidyl methacrylate, and allyl methacrylate. These can be polymerized alone or in combination of two or more thereof. Of these, from the viewpoints of transparency and heat resistance, methacrylic acid alkyl esters, such as methyl methacrylate, ethyl methacrylate, isopropyl methacrylate, n-butyl methacrylate, tert-butyl methacrylate, cyclohexyl methacrylate, and isobornyl methacrylate are preferred, with methyl methacrylate being more preferred.

From the viewpoints of transparency, flexibility, molding processability, and surface smoothness, a proportion of the methacrylic acid ester polymer block (g1) in the acrylic block copolymer is preferably in a range of 10% by mass to 70% by mass, and more preferably in a range of 25% by mass to 60% by mass. In the case where a plurality of the methacrylic acid ester polymer blocks (g1) are contained in the acrylic block copolymer, the aforementioned proportion is calculated on a basis of the total mass of all of the methacrylic acid ester polymer blocks (g1).

The acrylic acid ester polymer block (g2) is one in which a main constituent unit thereof is a structural unit derived from an acrylic acid ester. Examples of such an acrylic acid ester include polymers, such as methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, phenyl acrylate, benzyl acrylate, phenoxyethyl acrylate, 2-hydroxyethyl acrylate, 2-methoxyethyl acrylate, glycidyl acrylate, and allyl acrylate. These can be polymerized alone or in combination of two or more thereof.

From the viewpoints of stretchability and transparency, the acrylic acid ester polymer block (g2) is preferably a polymer of an acrylic acid alkyl ester and a (meth)acrylic acid aromatic ester. In the case where the acrylic acid ester polymer block (g2) is a polymer of an acrylic acid alkyl ester and a (meth)acrylic acid aromatic ester, from the viewpoint of transparency, it is preferred that the acrylic acid ester polymer block (g2) contains 50 to 90% by mass of a structural unit derived from the acrylic acid alkyl ester and 50 to 10% by mass of a structural unit derived from the (meth)acrylic acid aromatic ester.

From the viewpoints of transparency, flexibility, molding processability, and surface smoothness, a proportion of the acrylic acid ester polymer block (g2) in the acrylic block copolymer is preferably in a range of 30 to 90% by mass, and more preferably in a range of 40 to 75% by mass. In the case where a plurality of the acrylic acid ester polymer blocks (g2) are contained in the acrylic block copolymer, such a proportion is calculated on a basis of the total mass of all of the acrylic acid ester polymer blocks (g2).

Although a binding mode of the methacrylic acid ester polymer block (g1) and the acrylic acid ester polymer block (g2) in the acrylic block copolymer is not particularly limited, a diblock copolymer of a (g1)-(g2) structure, a triblock copolymer of a (g1)-(g2)-(g1) structure, a star-shaped block copolymer of a [(g1)-(g2)-]nX structure, and a star-shaped block copolymer of a [(g1)-(g2)-(g1)-]nX structure are preferred.

The acrylic block copolymer may have a functional group, such as a hydroxy group, a carboxyl group, an acid anhydride, and an amino group, in a molecular chain or molecular chain terminal thereof.

A weight average molecular weight of the acrylic block copolymer is preferably in a range of 60,000 to 400,000, and more preferably in a range of 60,000 to 200,000. When the weight average molecular weight of the acrylic block copolymer falls within the aforementioned range, a film with a favorable appearance tends to be obtained.

A production method of the acrylic block copolymer is not particularly limited, and a method in conformity with a known method can be adopted. For example, a method of subjecting monomers constituting the respective polymers to living polymerization is generally adopted. In addition, a commercially available product may be used as the acrylic block copolymer. For example, an acrylic thermoplastic elastomer "KURARITY" (manufactured by Kuraray Co., Ltd.) can be used.

The multilayered structure contains at least two layers of an inner layer and an outer layer and has at least one layer structure in which the inner layer and the outer layer are aligned in this order from the central layer toward the outermost layer direction. The multilayered structure may further have a crosslinkable resin layer in the inside of the inner layer or the outside of the outer layer.

The inner layer is a layer constituted of a crosslinked elastic body obtained through copolymerization of a monomer mixture of an acrylic acid alkyl ester and a crosslinkable monomer. As such an acrylic acid alkyl ester, an acrylic acid alkyl ester in which the carbon number of the alkyl group ranges from 2 to 8 is preferably used.

Such a crosslinkable monomer may be one having at least two polymerizable carbon-carbon double bonds in one molecule thereof. Examples thereof include unsaturated carboxylic acid diesters of a glycol compound, such as ethylene glycol dimethacrylate and butane diol dimethacrylate; alkenyl esters of an unsaturated carboxylic acid, such as allyl acrylate, allyl methacrylate, and allyl citrate; polyalkenyl esters of a polybasic acid, such as diallyl phthalate, diallyl maleate, triallyl cyanurate, and triallyl isocyanurate; unsaturated carboxylic acid esters of a polyhydric alcohol, such as trimethylolpropane triacrylate; and divinylbenzene, with alkenyl esters of an unsaturated carboxylic acid and polyalkenyl esters of a polybasic acid being preferred. The amount of the crosslinkable monomer in the mixture of all of the monomers is preferably in a range of 0.2 to 30% by mass, and more preferably in a range of 0.2 to 10% by mass from the viewpoint of improving impact resistance, heat resistance, and surface hardness of the substrate layer.

From the standpoint of heat resistance of the substrate layer, the outer layer is constituted of a hard thermoplastic resin obtained through polymerization of a monomer mixture containing methyl methacrylate in an amount of 80% by mass or more, and preferably 90% by mass or more. In addition, the hard thermoplastic resin contain other monofunctional monomer in an amount 20% by mass or less, and preferably 10% by mass or less.

As for content ratios of the inner layer and the outer layer in the multilayered structure, from the viewpoints of impact resistance, heat resistance, surface hardness, handling properties, easiness of melt kneading with the methacrylic resin, and so on regarding the resulting substrate layer, it is preferred that the content ratio of the inner layer is selected from a range of 40 to 80% by mass, and the content ratio of the outer layer is selected from a range of 20 to 60% by mass, on a basis of the mass of the multilayered structure (for example, the total amount of the inner layer and the outer layer in the case where the multilayered structure is composed of two layers). Although a method of producing the multilayered structure is not particularly limited, from the viewpoint of controlling a layer structure of the multilayered structure, it is preferred to produce the multilayered structure through emulsion polymerization.

As for the methacrylic resin composition, it is preferred that the content of the methacrylic resin is 10 to 99 parts by mass, and the content of the elastic body is 90 to 1 part by mass based on 100 parts by mass of a sum total of the methacrylic resin and the elastic body. When the content of the methacrylic resin is less than 10 parts by mass, the surface hardness of the substrate layer tends to be worsened. More preferably, the content of the methacrylic resin is 55 to 90 parts by mass, and the content of the elastic body is 45 to 10 parts by mass based on 100 parts by mass of the sum total of the methacrylic resin and the elastic body. Still more preferably, the content of the methacrylic resin is 70 to 90 parts by mass, and the content of the elastic body is 30 to 10 parts by mass.

The resin constituting the substrate layer may contain various additives, for example, an antioxidant, a thermostabilizer, a lubricant, a processing aid, an antistatic agent, an antioxidant, a colorant, an impact resistance aid, an ultraviolet absorber, a photostabilizer, and a fine grain. In addition, a glass transition temperature of the resin constituting the substrate layer is preferably 150° C. or lower.

<Constituent Materials of Adhesive Layer>

As for the material of the adhesive layer to be used for the film of the present invention, various materials can be used according to the purpose. For the purpose of heating the film to adhere to the adherend, it is necessary to have adhesiveness to the adherend at a molding temperature. Examples thereof include an acrylic resin; a polyolefin-based resin, such as polypropylene, polyethylene, polybutene, polymethylpentene, a chlorinated polyolefin, and an ethylene-vinyl acetate copolymer; a modified polyvinyl alcohol-based resin formed of modified polyvinyl alcohol, containing 25 to 70 mol % of an ethylene unit; a thermoplastic elastomer, such as an aromatic vinyl-based elastomer, a polyurethane-based elastomer, a polyamide-based elastomer, and a polyester-based elastomer; and a composition containing such a resin and/or elastomer.

As for the constituent material of the adhesive layer, from the viewpoint of making the moldability during decorative molding and the appearance quality of the surface after decorative molding favorable and the viewpoint of obtaining a film having an fc of 2.0 $mm^{-1}$ or less, a composition containing an acrylic resin or an aromatic vinyl-based elastomer is preferred, and a thermoplastic polymer composition containing a block copolymer (A) having a polymer block (a1) containing an aromatic vinyl compound unit and a polymer block (a2) containing a conjugated diene compound unit and a polypropylene-based resin (B) is more preferred.

Examples of the aromatic vinyl compound constituting the polymer block (a1) in the block copolymer (A) include styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, 1-vinylnaphthalene, and 2-vinylnaphthalene, and the aromatic vinyl compound may be made of either one or two or more thereof. Above all, from the viewpoint of fluidity, styrene, α-methylstyrene, and 4-methylstyrene are preferred.

Examples of the conjugated diene compound constituting the polymer block (a2) in the block copolymer (A) include butadiene, isoprene, 2,3-dimethyl-1,3-butadiene, 1,3-pentadiene, and 1,3-hexadiene, and the conjugated diene compound may be made of either one or two or more thereof. Above all, a structural unit derived from butadiene and/or isoprene is preferred.

A binding mode of the polymer block (a1) containing the aromatic vinyl compound unit and the polymer block (a2) containing the conjugated diene compound unit in the block copolymer (A) is not particularly limited, and it may be any of linear, branched, and radial binding modes, or a combined binding mode of two or more thereof. Above all, a triblock copolymer is preferred, and a triblock copolymer expressed by a1-a2-a1 is more preferred, because it is easy for production and excellent in stretchability and adhesiveness.

As for the block copolymer (A), from the viewpoints of heat resistance and weather resistance, it is preferred that a part or the whole of the polymer block (a2) containing the conjugated diene compound is hydrogenated. A hydrogenation rate of the polymer block (a2) containing the conjugated diene compound is preferably 80% or more, and more preferably 90% or more. The hydrogenation rate is a value obtained through measurement of an iodine value of the block copolymer before and after the hydrogenation reaction.

In the block copolymer (A), from the viewpoint of adhesiveness, the content of the polymer block (a1) containing the aromatic vinyl compound unit is preferably in a range of 5 to 75% by mass, more preferably in a range of 5 to 60% by mass, and still more preferably in a range of 10 to 40% by mass relative to the whole of the block copolymer (A). In addition, from the viewpoint of adhesiveness, a weight average molecular weight of the block copolymer (A) is preferably in a range of 30,000 to 500,000, more preferably in a range of 60,000 to 200,000, and still more preferably in a range of 80,000 to 180,000. Here, the weight average molecular weight is a weight average molecular weight as expressed in terms of polystyrene as determined by means of gel permeation chromatography (GPC) measurement.

Although the block copolymer (A) is not particularly limited with respect to a production method thereof, it can be, for example, produced by an anionic polymerization method. Specifically, examples thereof include (i) a method of using an alkyllithium compound as an initiator and successively polymerizing the aromatic vinyl compound and the conjugated diene compound; (ii) a method of successively polymerizing the aromatic vinyl compound and the conjugated diene compound with an alkyllithium compound as an initiator and then adding a coupling agent, to undergo coupling; and (iii) a method of successively polymerizing the conjugated diene compound and the aromatic vinyl group with a dilithium compound as an initiator.

Although a known polypropylene-based resin can be used as the polypropylene-based resin (B), one having the content of a structural unit derived from propylene of 60 mol % or more is preferred, and one having the content of a structural unit derived from propylene of 80 mol % or more is more preferred. Examples of a structural unit derived from other compound than propylene include a structural unit derived from ethylene; and a structural unit derived from an α-olefin, such as 1-butene, 1-hexene, 1-heptene, 1-octene, 4-methyl-1-pentene, 1-nonene, and 1-decene; and besides, a structural unit derived from a modifying agent.

Examples of the polypropylene-based resin (B) include homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, a propylene-ethylene-hexene random copolymer, and modified products thereof. Examples of the modified product include one obtained through graft copolymerization of a modifying agent on a polypropylene-based resin; and one obtained through copolymerization of a modifying agent on a main chain of a polypropylene-based resin.

Of these, a polar group-containing polypropylene-based resin that is the modified product is preferred as the polypropylene-based resin (B). Examples of the polar group which the polar group-containing polypropylene-based resin has include a (meth)acryloyloxy group; a hydroxy group; an amide group; a halogen atom, such as a chlorine atom; a carboxyl group; and an acid anhydride group. Although the polar group-containing polypropylene-based resin is not particularly limited with respect to a production method thereof, it is obtained through random copolymerization, block copolymerization, or graft copolymerization of propylene and a polar group-containing copolymerizable monomer that is the modifying agent, by a known method. Of these, random copolymerization and graft copolymerization are preferred, and graft copolymerization is more preferred. Besides, the polar group-containing polypropylene-based resin is also obtained by subjecting a polypropylene-based resin to a reaction, such as oxidation and chlorination, by a known method.

Examples of the polar group-containing copolymerizable monomer include vinyl acetate, vinyl chloride, ethylene oxide, propylene oxide, an acrylamide, and an unsaturated carboxylic acid or its ester or anhydride. Above all, an unsaturated carboxylic acid or its ester or anhydride is preferred. Examples of the unsaturated carboxylic acid or its ester or anhydride include (meth)acrylic acid, a (meth)acrylic acid ester, maleic acid, maleic anhydride, fumaric acid, itaconic acid, itaconic anhydride, himic acid, and himic anhydride. These polar group-containing copolymerizable monomers may be used alone, or may be used in combination of two or more thereof.

As for the thermoplastic polymer composition constituting the adhesive layer, one containing 1 to 30 parts by mass of the polypropylene-based resin (B) is preferred based on 100 parts by mass of the block copolymer (A), and one containing 5 to 25 parts by mass of the polypropylene-based resin (B) is more preferred. When the content of the polypropylene-based resin (B) falls within the aforementioned range, the resulting film has favorable adhesiveness and is excellent in moldability during decorative molding and appearance quality of the surface after decorative molding.

Furthermore, in the film of the present invention, in order to obtain high designability, a functional layer can be added in addition to the substrate layer and the adhesive layer. By providing a functional layer having a hardness on the surface side relative to the substrate layer, scratching on the film can be prevented from occurring. In addition, by adding a design layer colored or formed with a pattern by means of printing or the like between the substrate layer and the adhesive layer, it becomes possible to perform decoration in a wider color or a pattern.

<Production Method of Film>

The film of the present invention can be produced by a known method, such as a T-die method, an inflation method, a melt casting method, and a calendering method. In addition, in the case where the film of the present invention has the substrate layer and the adhesive layer, though a method of laminating these layers is not particularly limited, examples thereof include a method of coating a solution of the resin constituting the adhesive layer on the substrate layer; a method of laminating the adhesive layer on the substrate layer; and a coextrusion molding method of laminating the resin constituting the substrate layer and the resin constituting the adhesive layer within a die. Of these methods, a coextrusion molding method is preferred from the standpoint that a step of separately molding the substrate is unnecessary.

The coextrusion molding method can be performed by a known method, such as a T-die method and an inflation method. Examples of the T-die method include a multi-manifold method and a feed block method. In particular, from the viewpoint of thickness accuracy, coextrusion molding by the multi-manifold method is preferred. From the viewpoint that after coextrusion molding, a film with favorable surface smoothness is obtained, a method including steps of extruding a melt kneaded material in a molten state from a T die and bringing the both surfaces into contact with a mirror roll surface or a mirror belt surface to undergo molding is preferred. As for the roll or belt to be used on this occasion, it is preferred that all of them are made of a metal or a silicon rubber.

In view of the fact that the film of the present invention has favorable elongation characteristics and adhesive force, the film can be suitably adhered to the adherend by means of vacuum molding and/or pressure molding (namely, vacuum molding, pressure molding, or vacuum pressure molding) without using an adhesive. According to this, the adherend is coated by the film, and the concaves and convexes of the surface thereof are reduced, so that a molded product with a favorable appearance quality can be obtained.

[Decorative Molded Product]

When the film of the present invention is adhered to the adherend surface, the decorative molded product is obtained. As for the material of the adherend, a material according to the purpose can be used. Examples of the adherend include metals which can be used for housings of automobile, etc.; and resins which are used for housings of a cellular phone, a mobile device, a household appliance, etc. Specifically, examples of the resin include a polycarbonate resin, a PET resin, a polyamide resin, a polyethylene resin, a polypropylene resin, a polystyrene resin, a polyvinyl chloride resin, a (meth)acrylic resin, an ABS resin, an ABS/polycarbonate resin, an epoxy resin, a phenol resin, and a melamine resin. Examples of the metal include aluminum, nickel, magnesium, zinc, iron, chromium, and copper. In addition, a non-woody material, such as kenaf, and a wood may also be used.

The adhesiveness of the film of the present invention to the adherend can be measured in terms of, for example, peel strength, shear adhesive strength, tensile adhesive strength, or flexural adhesive strength.

When the film of the present invention is adhered to the adherend at any temperature of the range of Tg to (Tg+50 [° C.]) and a pressure of 0.3 MPa, its peel strength is preferably 5 N/25 mm or more.

Such peel strength is more preferably 10 N/25 mm or more, and still more preferably 15 N/25 mm or more. It is indicated that the larger the peel strength, the higher the adhesive force, and such is preferred. When the adhesive force becomes thoroughly large, breakage of the film or the material to be adhered is caused. Here, the peel strength is a value measured in conformity with JIS K6854-1. An actual measurement method is mentioned later in the section of Examples.

Although it is preferred that the film of the present invention has the aforementioned peel strength to all kinds of adherends, in particular, it is preferred that the film has the aforementioned peel strength to at least one adherend of a polypropylene resin sheet, a methyl methacrylate resin sheet, and an ABS resin sheet; and it is preferred that the film has the aforementioned peel strength to all kinds of adherends of a polypropylene resin sheet, a methyl methacrylate resin sheet, and an ABS resin sheet.

As for the adherend, an average linear roughness Ra of the surface onto which the film is adhered is preferably 0.01 to 10 μm. In this case, on the occasion of subjecting the film of the present invention to decorative molding, the effect for making the appearance quality favorable is remarkable.

Furthermore, it is preferred that the surface of the adherend onto which the film is adhered has a concave part or a convex part each having a width W of 0.1 μm or more and a height H of 0.02 μm or more, with a ratio of the height H to the width W (H/W) being 0.02 or more. In this case, on the occasion of subjecting the film of the present invention to decorative molding, the effect for making the appearance quality favorable is remarkable, too.

A manner of collecting a concave and convex of the adherend is explained by reference to FIG. 13.

Figure 13:
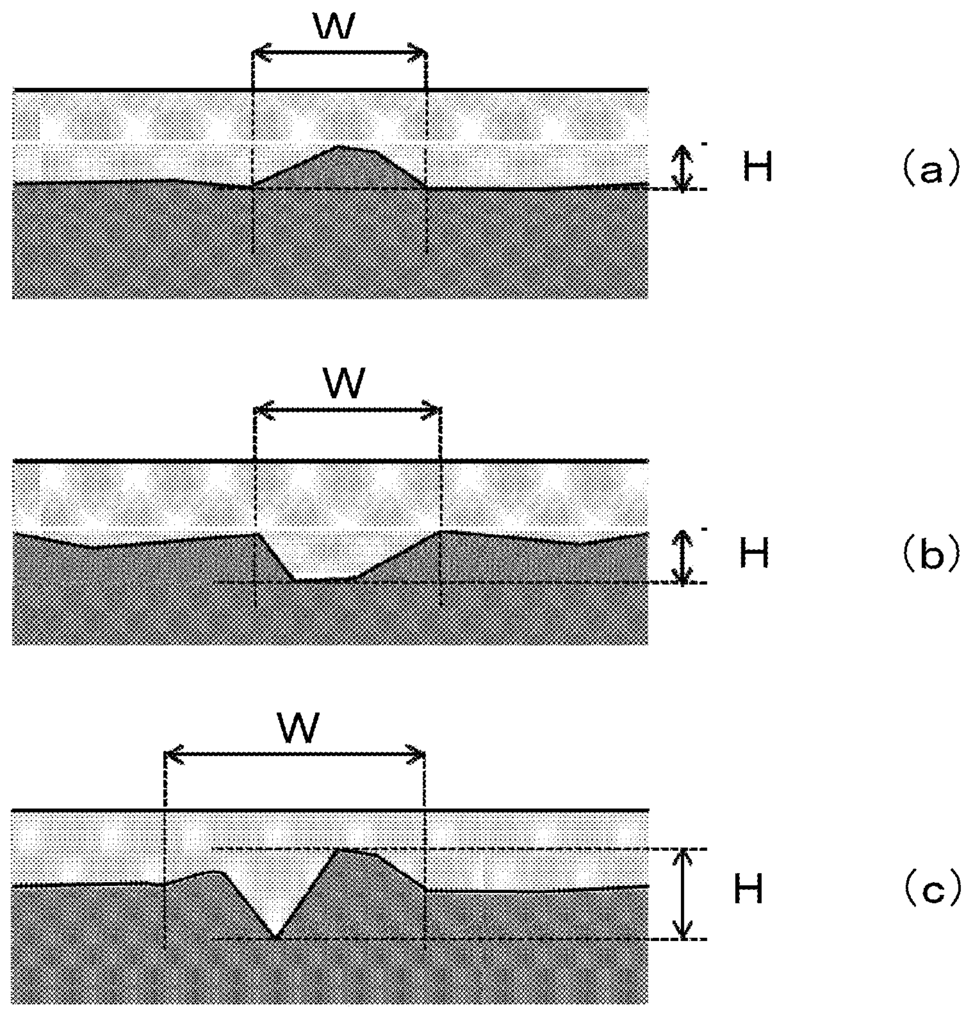
FIG. 13 is an explanatory view for collecting a width (W) and a height (H) in a concave and convex of an adherend.

In the case of a single concave part, a width where its height is largely different from a height of the surroundings is designated as W (FIG. 13(*a*)). A value deviated by 5% or more of the height H as compared with the average surface of the surroundings is set up as a standard. The same is applicable to the case of a concave part (FIG. 13(*b*)). In the case where a concave part and a convex part coexist, the width and the height are a combined value of the both, respectively (FIG. 13(*c*)).

In the case of a scratch in the two-dimensional direction, the width and the height can be collected in a cross section thereof. In the case of a point-like defect, the width and the height are collected with respect to a cross section at a position where the defect is highest (deepest). The surface concaves and convexes of the adherend can be measured by the method using a tracer type surface roughness meter, as described in the section of Examples as mentioned later.

<Production Method of Decorative Molded Product>

A production method of the decorative molded product is not particularly limited, and examples thereof include insert molding, vacuum molding, pressure molding, compression molding, and three dimension overlay method (TOM molding). Of these, it is preferred to adhere the film of the present invention to the adherend by means of vacuum molding and/or pressure molding, and it is more preferred to adopt vacuum molding or TOM molding from the standpoint that the film can be accurately shaped and adhered relative to a variety of adherends.

An adhesion temperature during adhering the film of the present invention to the adherend by means of vacuum molding and/or pressure molding is preferably in a range of Tg to (Tg+50 [° C.]). In such an adhesion temperature range, it is easy to maintain the elongation at break of the film at 50% or more. The adhesion temperature is more preferably in a range of (Tg+10 [° C.]) to (Tg+50 [° C.]), and still more preferably in a range of (Tg+20 [° C.]) to (Tg+50 [° C.]).

As for a vacuum molding apparatus for subjecting the film of the present invention to TOM molding, for example, a vacuum molding apparatus described in JP 2002-067137 A or a coating apparatus described in JP 2005-262502 A can be suitably used, and the foregoing vacuum molding apparatus or coating apparatus is provided with a chamber box capable of installing a film and an adherend and being blocked up, followed by reducing the pressure.

The method of producing a molded product by means of TOM molding includes a step of accommodating a film and an adherend in a chamber box; a step of reducing the pressure within the chamber box; a step of dividing the inside of the chamber box into two parts by the film; and a step of making the pressure within the chamber box not having the adherend higher than the pressure within the chamber box having the adherend, thereby coating the adherend by the film. In the step of accommodating the film and the adherend in the chamber box, the step of dividing the inside of the chamber box into two parts by the film may be carried out at the same time.

As for a heating temperature of the film in the TOM molding, from the viewpoint of shaping properties, when a highest temperature of glass transition temperatures of the film is designated as Tg [° C.], it is desired to carry out the TOM molding in a range of Tg to (Tg+50 [° C.]) because the elongation at break of the film can be maintained at 50% or more. A range of (Tg+10 [° C.]) to (Tg+50 [° C.]) is more preferred, and a range of (Tg+20 [° C.]) to (Tg+50 [° C.]) is still more preferred.

As for a heating temperature of the film in the TOM molding, from the viewpoints of the shaping properties and the appearance after sticking to the adherend having concaves and convexes, it is desired to carry out the TOM molding in a range of Tg to (Tg+50 [° C.]). A range of Tg to (Tg+20 [° C.]) is more preferred, and a range of Tg to (Tg+10 [° C.]) is still more preferred because the stiffness of the film can be maintained and can be made compatible with the shaping properties.

As for a processing pressure in the TOM molding, from the viewpoint of the appearance after sticking to the adherend having concaves and convexes, the processing pressure is preferably lower. The processing pressure is preferably in a range of atmospheric pressure (about 0.1 [MPa])+0.2 [MPa] or less (namely about 0.3 MPa or less), more preferably in a range of atmospheric pressure +0.1 [MPa] or less (namely about 0.2 MPa or less), and still more preferably atmospheric pressure (namely about 0.1 MPa: the case of not using compressed air).

[Application]

The film of the present invention is excellent in moldability and is able to reduce concaves and convexes having a variety of sizes which the adherend has, and therefore, it can be suitably used for articles or structures in which the designability is required as the decorative material. Examples of such an article or structure include signboard components, such as an advertising pillar, a stand signboard, a side signboard, a transom signboard, and a rooftop signboard; display components, such as a showcase, a divider panel, and a store display; illumination components, such as a fluorescent lamp cover, a mood lighting cover, a lamp shade, a luminous ceiling, a luminous wall, and a chandelier; interior design components, such as furniture, a pendant, and a mirror; construction components, such as a door, a dome, a safety window glass, a partition, a staircase wainscot, a balcony wainscot, and a roof of a leisure building; transportation-related components, such as an automobile interior or exterior member and an automobile exterior member, e.g., a bumper; electronics components, such as a nameplate for an audiovisual system, a stereo cover, a vending machine, a cellular phone, and a personal computer; an incubator, a ruler, a dial, a greenhouse, a large-sized tank, a box water tank, a bathroom member, a clock panel, a bath tub, a sanitary, a desk mat, a gaming machine component, a toy, a musical instrument, and a wallpaper; a marking film; and various household appliances.

EXAMPLES

The present invention is more specifically described below by reference to Examples, but it should be construed that the present invention is by no means limited by the Examples.

Details of measurements performed in the Examples and Comparative Examples are described below.

[Measurement Method of Thickness of Each Layer of Film]

The thicknesses of the substrate layer and the adhesive layer of the film were each measured with a micrometer (U-shaped steel plate micrometer, manufactured by Mitutoyo Corporation).

[Measurement Method of Glass Transition Temperature]

The film used in each of the Examples and Comparative Examples was subjected to temperature rise at a temperature rise rate of 10° C./min by using a differential scanning calorimeter ("DSC-822", manufactured by Mettler Toledo International Inc.), and the glass transition temperature was determined as an extrapolated onset temperature in the resulting curve.

[Measurement Method of Modulus]

In order to measure the modulus of each of the substrate layer and the adhesive layer of the film, a dynamic viscoelasticity test by a dynamic viscoelastometer was carried out. As for the dynamic viscoelastometer, "Rheogel-E4000", manufactured by UBM was used for the modulus measurement of the substrate layer, and "DMS6100", manufactured by SII NanoTechnology Inc. was used for the modulus measurement of the adhesive layer. A sample was cut out into a size of 16 mm in length and 5 mm in width, and a chuck-to-chuck distance was set to 10 mm. In addition, the test was carried out in a tensile mode at a measurement temperature of 50° C. to 160° C. and at an excitation frequency of 11 Hz. A storage modulus E' [Pa] at the molding temperature of the film was designated as the modulus.

[Measurement Method of Elongation at Break]

In order to measure the elongation at break of the film, a tensile test was carried out with a tensile tester ("INSTRON 5566", manufactured by Instron, Inc.). The film was cut out into a size of 80 mm in length and 20 mm in width, and the test was carried out in a chuck-to-chuck distance of 40 mm at a tensile rate of 500 mm/min and at 130° C. Drawing was performed up to 300% in terms of a maximum elongation, and the elongation at a point when the film was broken was designated as the elongation at break.

[Moldability Evaluation]

A glass (50×50 mm, 3 mm in thickness) was placed in a molding region within a vacuum pressure molding machine ("NGF-0406-T", manufactured by Fu-se Vacuum Forming Ltd.), and "3M Imperial Wrapping Film Sheet", manufactured by 3M Company (grain size: 12 μm, abrasive grain: aluminum oxide) was fixed on the glass. The glass was heated to 60° C. by a hot water heating type temperature control mechanism of the molding machine. Subsequently, the film used in each of the Examples and Comparative Examples was heated with an infrared heater to a predetermined temperature (film processing temperature shown in Table 1) selected from a range of Tg to (Tg+50 [° C.]) and subjected to three dimension overlay method (TOM) at a pressure of 0.3 MPa, to adhere the film to the aforementioned wrapping film sheet. The moldability of the film on this occasion was evaluated according to the following criteria.

A: Possible for molding without causing breakage

B: Breakage on the way of molding

[Measurement Method of Amplitude at Each Frequency f]

In order to measure the concaves and convexes on the wrapping film sheet surface or the film surface after adhering the film of each of the Examples and Comparative Examples on the wrapping film sheet in the aforementioned moldability evaluation, the sample fixed on the glass sheet was measured three times with a tracer type surface roughness meter ("DekTak 150", manufactured by Bruker AXS GmbH) under the following condition.

Scan Length: 15,000 μm
Scan Duration: 100 sec
Meas. Range: 65.5 μm
Stylus Force: 1.00 mg
Obtained result Zn(X) Xn=0.0005 [mm]×n (n=0, 1, 2 . . . )

From this result, a cubic fitting function (Z'n(X)=aX3+bX2+cX+d) was determined by the least squares method. By collecting a difference between the measurement result and the fitting function, the undulations of the glass sheet on the occasion of the measurement were removed.

Further, an arithmetic average roughness (Ra) was determined according to the following equation using the difference.

$$Ra = \frac{1}{N}\sum_{n=1}^{N}|Z_n(X_n) - Z'_n(X_n)| \quad \text{[Math. 2]}$$

As a result, the arithmetic average roughness (Ra) of the wrapping film sheet was found to be 2.4 μm.

Furthermore, in the obtained result, data of 4,096 points were extracted at every 7 points and subjected to the fast Fourier transform, to calculate amplitudes at respective frequencies f of the wrapping film sheet and the film surface adhered to the wrapping film sheet.

[Measurement Method of Fc]

By determining a ratio of the amplitude $A_1(f)$ at each frequency f of the surface of "3M Imperial Wrapping Film Sheet", manufactured by 3M Company (grain size: 12 μm, abrasive grain: aluminum oxide) and the amplitude $A_2(f)$ at each frequency f of the film surface adhered onto the wrapping film sheet ($A_2(f)/A_1(f)$, a damping ratio $\phi(f)$ was determined.

Next, on the assumption that four points before and after each of the damping ratios became 1/10 are designated as ($f_1$, $\phi_1$), ($f_2$, $\phi_2$), ($f_3$, $\phi_3$), and ($f_4$, $\phi_4$), and these four points can be approximated in terms of an exponential function, the approximation was performed by adopting the least squares method. By substituting $\phi$=0.1 for the following approximation equation, fc was determined.

$$\phi = a\cdot\exp(b\cdot f)$$

[Appearance Evaluation]

The appearance of the film surface adhered onto the wrapping film sheet as prepared in the aforementioned moldability evaluation was visually observed and evaluated according to the following criteria.

A: The surface is smooth and glossy, and is free from undulations

B: Although the surface is smooth and glossy, undulations are observed.

C: Fine concaves and convexes are observed on the surface.

[Adhesiveness Evaluation]

The film of each of the Examples and Comparative Examples was stuck onto a resin of every sort and measured for the peel strength, to evaluate the adhesiveness of the film. The measurement of the peel strength was followed in conformity with JIS K6854-1.

As for the resin which was measured for the peel strength upon being stuck onto the film of the present invention, each of a polypropylene-based resin (a trade name; NOVATEC MA3, manufactured by Japan Polypropylene Corporation; hereinafter also referred to as "PP resin"), an acrylonitrile-butadiene-styrene-based resin (a trade name: STYLAC 220S27, manufactured by Asahi Kasei Corporation; hereinafter also referred to "ABS resin"), and a methyl methacrylate resin (a trade name: PARAPET HRS, manufactured by Kuraray Co., Ltd.; hereinafter also referred to as "acrylic resin") was extrusion molded to form a sheet, followed by cutting into a size of 25 mm in width and 150 mm in length.

Using a TOM molding machine (NGF0406 molding machine, manufactured by Fu-se Vacuum Forming Ltd.), the sheet cut after extrusion molding was aligned on a plane surface stage within the molding machine, and the film of the present invention was thermally stuck thereonto at a film processing temperature described in each of the Examples and Comparative Examples and at a pressure of 0.3 MPa, thereby preparing a sample for peel strength evaluation.

The substrate layer side of the sample was fixed to an SUS plate with a strong pressure-sensitive adhesive tape and measured with a peel tester (AGS-X, manufactured by Shimadzu Corporation) under a condition at a peel angle of 90°, a tensile rate of 300 mm/min, and an environmental temperature of 23° C., to measure the peel strength, and the adhesiveness was evaluated according to the following criteria.

A: The peel strength is 10 N/25 mm or more.

B: The peel strength is 5 N/25 mm or more and less than 10 N/25 mm.

C: The peel strength is smaller than 5 N/25 mm.

Production Example 1: Production of Substrate Layer Composition 1

20 parts by mass of an acrylic block copolymer (G-1) produced in the following Production Example 1-1 and 80 parts by mass of a methacrylic resin (F-1) produced in Production Example 1-2 were melt kneaded at 230° C. with a biaxial extruder (TEM-28, manufactured by Toshiba Machine Co., Ltd.) and then extruded in a strand form, followed by cutting to produce pellets of a substrate layer composition 1.

Production Example 1-1: Production of Acrylic Block Copolymer (G-1)

In a three-neck flask in which the inside thereof had been deaerated and replaced with nitrogen, 735 g of dry toluene, 0.4 g of hexamethyltriethylene tetramine, and 39.4 g of a toluene solution containing 20 mmol of isobutylbis(2,6-di-tert-butyl-4-methylphenoxy)aluminum were added at room temperature, and 1.17 mmol of sec-butyllithium was further added. 35.0 g of methyl methacrylate was added to this, and the contents were allowed to react with each other at a room temperature of 25° C. for 1 hour. Subsequently, the reaction liquid was regulated to −25° C., and a liquid mixture of 24.5 g of n-butyl acrylate and 10.5 g of benzyl acrylate was dropped over 0.5 hours.

Subsequently, 35.0 g of methyl methacrylate was added, and the reaction liquid was returned to room temperature, followed by stirring for 8 hours. Thereafter, 4 g of methanol was added to the reaction liquid to terminate the polymerization. Thereafter, the reaction liquid was poured into a large quantity of methanol, and a filtrate was dried under a condition at 80° C. and 1 torr (about 133 Pa) for 12 hours, thereby obtaining an acrylic block copolymer (G-1) that is polymethyl methacrylate-poly(n-butyl acrylate/benzyl acrylate)-polymethyl methacrylate. A weight average molecular weight of the obtained acrylic block copolymer (G-1) was found to be 120,000.

Production Example 1-2: Production of Methacrylic Resin (F-1)

To a monomer mixture composed of 95 parts by mass of methyl methacrylate and 5 parts by mass of methyl acrylate, 0.1 parts by mass of a polymerization initiator ((2,2'-azobis (2-methylpropionitrile), hydrogen abstraction ability: 1%, one-hour half-life temperature: 83° C.) and 0.28 parts by mass of a chain transfer agent (n-octyl mercaptan) were added and dissolved to obtain a raw material liquid. In addition, 100 parts by mass of ion exchange water, 0.03 parts by mass of sodium sulfate, and 0.45 parts by mass of a suspension dispersant were mixed in another vessel, to obtain a liquid mixture. In a pressure-resistant polymerization tank, 420 parts by mass of the aforementioned liquid mixture and 210 parts by mass of the aforementioned raw material liquid were charged, and a polymerization reaction was commenced in a nitrogen atmosphere with stirring at a temperature of 70° C. After elapsing 3 hours after commencement of the polymerization reaction, the temperature was raised to 90° C., and the stirring was uninterruptedly performed for 1 hour, to obtain a liquid having a beaded copolymer dispersed therein. The obtained copolymer dispersion liquid was washed with an appropriate amount of ion exchange water, and the beaded copolymer was taken out by a bucket type centrifuge and dried for 12 hours by a hot air dryer at 80° C., to obtain a beaded methacrylic resin (F-1) having a weight average molecular weight of 30,000 and a Tg of 128° C.

Production Example 2: Production of Substrate Layer Composition 2

80 parts by mass of a methacrylic resin ("PARAPET EH", manufactured by Kuraray Co., Ltd., weight average molecular weight: 30,000, glass transition temperature: 118° C.) and 20 parts by mass of a multilayered structure (E-1) produced in the following Production Example 2-1 were melt kneaded at 230° C. with a biaxial extruder and then extruded in a strand form, followed by cutting to produce pellets of a substrate layer composition 2.

Production Example 2-1: Production of Multilayered Structure (E-1)

In a reactor equipped with a stirrer, a thermometer, a nitrogen gas introducing pipe, a monomer introducing pipe, and a reflex condenser, 1,050 parts by mass of ion exchange water, 0.5 parts by mass of sodium dioctylsulfosuccinate, and 0.7 parts by mass of sodium carbonate were charged, and after thoroughly replacing the inside of the vessel with a nitrogen gas, the inner temperature was set to 80° C. 0.25 parts by mass of potassium persulfate was put into the same reactor, and the contents were stirred for 5 minutes. 245 parts by mass of a monomer mixture composed of methyl methacrylate/methyl acrylate/allyl methacrylate=94/5.8/0.2 (mass ratio) was then continuously dropped over 50 minutes, and after completion of dropping, a polymerization reaction was further performed for 30 minutes.

Subsequently, 0.32 parts by mass of potassium peroxodisulfate was put into the same reactor, and the contents were stirred for 5 minutes. 315 parts by mass of a monomer mixture composed of 80.6% by mass of butyl acrylate, 17.4% by mass of styrene, and 2% by mass of allyl methacrylate was then continuously dropped over 60 minutes, and after completion of dropping, a polymerization reaction was further performed for 30 minutes.

Subsequently, 0.14 parts by mass of potassium peroxodisulfate was put into the same reactor, and the contents were stirred for 5 minutes. 140 parts by mass of a monomer mixture composed of methyl methacrylate/methyl acrylate=94/6 (mass ratio) was then continuously dropped over 30 minutes, and after completion of dropping, a polymerization reaction was further performed for 60 minutes, to obtain a multilayered structure (E-1).

Production Example 3: Production of Adhesive Layer Composition 1

80 parts by mass of a thermoplastic elastomer (A-1) produced in the following Production Example 3-1 and 20 parts by mass of a polar group-containing polypropylene-based resin (B-1) produced in the following Production Example 3-2 were melt kneaded at 230° C. with a biaxial extruder (TEM-28, manufactured by Toshiba Machine Co., Ltd.) and then extruded in a strand form, followed by cutting to produce pellets of an adhesive layer composition 1.

Production Example 3-1: Production of Thermoplastic Elastomer (A-1)

In a pressure-resistant vessel which had been replaced with nitrogen and dried, 64 L of cyclohexane as a solvent, 0.20 L of sec-butyllithium (10% by mass cyclohexane solution) as an initiator, and 0.3 L of tetrahydrofuran as an organic Lewis base were charged. After raising the temperature to 50° C., 2.3 L of styrene was added, and the contents were polymerized for 3 hours. 23 L of isoprene was uninterruptedly added, and the contents were polymerized for 4 hours. 2.3 L of styrene was further added, and the contents were polymerized for 3 hours. The obtained reaction liquid was poured into 80 L of methanol, and a deposited solid was separated by means of filtration and dried at 50° C. for 20 hours, to obtain a triblock copolymer composed of polystyrene-polyisoprene-polystyrene. Subsequently, 10 kg of the triblock copolymer composed of polystyrene-polyisoprene-polystyrene was dissolved in 200 L of cyclohexane, palladium carbon (palladium supporting amount: 5% by mass) as a hydrogenation catalyst was added in an amount of 5% by mass relative to the copolymer, and a reaction was performed for 10 hours under a condition at a hydrogen pressure of 2 MPa and 150° C. After allowing to stand for cooling and pressure releasing, the palladium carbon was removed by means of filtration, and a filtrate was concentrated and further vacuum dried, to obtain a hydrogenated product of a triblock copolymer composed of polystyrene-polyisoprene-polystyrene (hereinafter referred to as "thermoplastic elastomer (A-1)"). The obtained thermoplastic elastomer (A-1) had a weight average molecular weight of 107,000, a styrene content of 21% by mass, a hydrogenation rate of 85%, a molecular weight distribution of 1.04, and a sum total of a 1,2-bond and a 3,4-bond contained in the polyisoprene block of 60 mol %.

Production Example 3-2: Production of Polar Group-Containing Polypropylene-Based Resin (B-1)

42 kg of polypropylene (Prime Polypro F327, manufactured by Primer Polymer Co., Ltd.), 160 g of maleic anhydride, and 42 g of 2,5-dimethyl-2,5-di(tert-butylperoxy) hexane were melt kneaded with a batch mixed under a condition at 180° C. and a screw rotation number of 40 rpm, to obtain a polar group-containing polypropylene-based resin (B-1). The polar group-containing polypropylene-based resin (B-1) had an MFR at a temperature of 230° C. and a load of 2.16 kg (21.2 N) of 6 g/10 min, a maleic anhydride concentration of 0.3%, and a melting point of 138° C.

Production Example 4: Production of Adhesive Layer Composition 2

72.5 parts by mass of the thermoplastic elastomer (A-1) produced in Production Example 3-1, 7.5 parts by mass of an acrylic resin ("PARAPET HRS", manufactured by Kuraray Co., Ltd.), and 20 parts by mass of a polypropylene-based resin ("Prime Polypro J229E", manufactured by Primer Polymer Co., Ltd.) were melt kneaded at 230° C. with a biaxial extruder (TEM-28, manufactured by Toshiba Machine Co., Ltd.) and then extruded in a strand form, followed by cutting to produce pellets of an adhesive layer composition 2.

Production Example 5: Production of Adhesive Layer Composition 3

In a three-neck flask in which the inside thereof had been deaerated and replaced with nitrogen, 1,040 parts by mass of dry toluene, 52.0 parts by mass of 1,2-dimethoxyethane, and 60.0 parts by mass of a toluene solution containing 40.2 mmol of isobutylbis(2,6-di-tert-butyl-4-methylphenoxy)aluminum were added at 25° C., and 5.17 parts by mass of a liquid mixture of cyclohexane and n-hexane containing 2.98 mmol of sec-butyllithium was further added. 25.0 g of methyl methacrylate was added to this, and the contents were allowed to react with each at 25° C. for 1 hour. Subsequently, the reaction liquid was regulated to −30° C., and 204.0 parts by mass of n-butyl acrylate was dropped over 2 hours.

Subsequently, 35.0 parts by mass of methyl methacrylate was added, and the reaction liquid was returned to 25° C., followed by stirring for 8 hours. Thereafter, 3.50 g of methanol was added to the reaction liquid to terminate the polymerization. Thereafter, the reaction liquid was poured into a large quantity of methanol, and a filtrate was dried under a condition at 80° C. and 1 torr (about 133 Pa) for 12 hours, thereby obtaining a polymethyl methacrylate polymer-poly(n-butyl acrylate)-polymethyl methacrylate polymer. A weight average molecular weight of the obtained copolymer was found to be 115,000. This was used as it was, to prepare an adhesive layer composition 3.

Example 1

The substrate layer composition 1 obtained in Production Example 1 was used as a material of the substrate layer. In addition, the adhesive layer composition 1 obtained in Production Example 3 was used as a material of the adhesive layer. The pellets of these two resins were respectively put into separate hoppers of a 25 mmϕ vent type single-screw extruder ("VGM25-28EX", manufactured by G.M. ENGINEERING Co., Ltd.) and coextruded from a multimanifold die at an extrusion temperature of 240° C. The extruded resin was sandwiched between a silicon rubber roll having a surface temperature of 40° C. and a metal rigid roll having a surface temperature of 90° C., to obtain a film having the substrate layer and the adhesive layer. As a result of measuring the thickness of each of the layers of the film, the thickness of the substrate layer was $12\times10^{-5}$ m, and the thickness of the adhesive layer was $6\times10^{-5}$ m.

Figure 14:
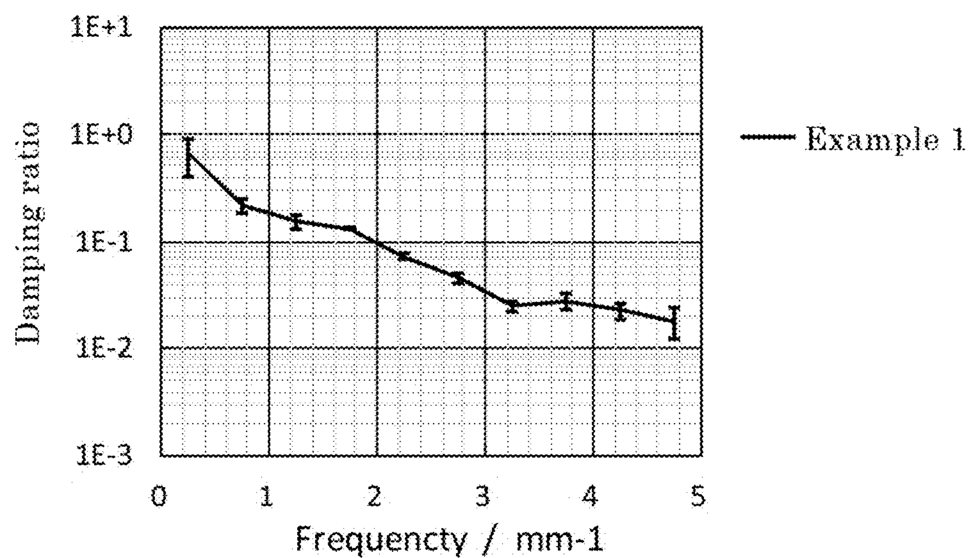
FIG. 14 is a graph showing a relation between a damping ratio and a frequency in Example 1.

This film was subjected to the moldability evaluation, the appearance evaluation, the adhesiveness evaluation, and the calculation of fc. The results are shown in Table 1 and FIG. 14.

Example 2

Figure 15:
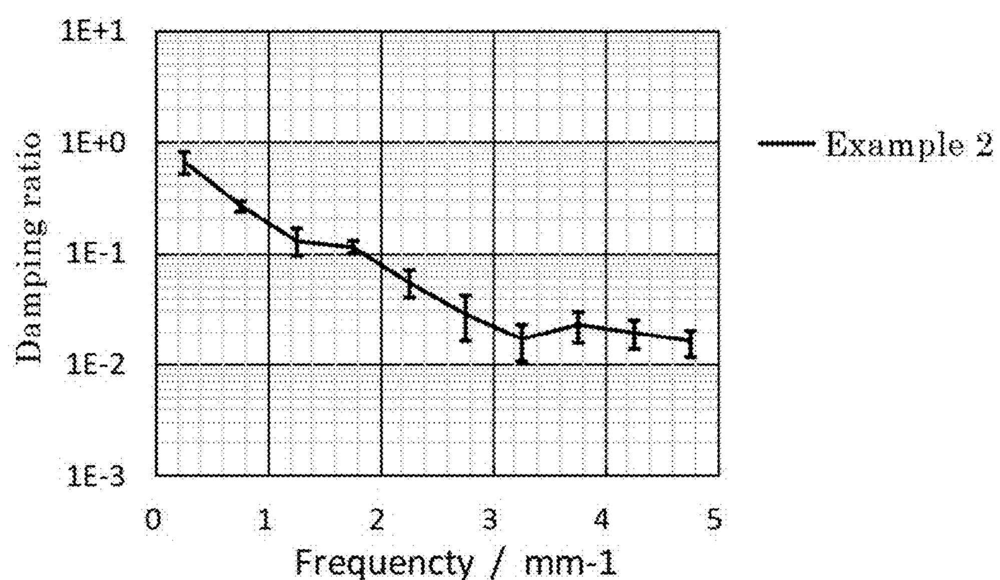
FIG. 15 is a graph showing a relation between a damping ratio and a frequency in Example 2.

A film was prepared in the same method as in Example 1, except that the thickness of the adhesive layer was set to $10\times10^{-5}$ m. This film was subjected to the moldability evaluation, the appearance evaluation, the adhesiveness evaluation, and the calculation of fc. The results are shown in Table 1 and FIG. 15.

Example 3

Figure 16:
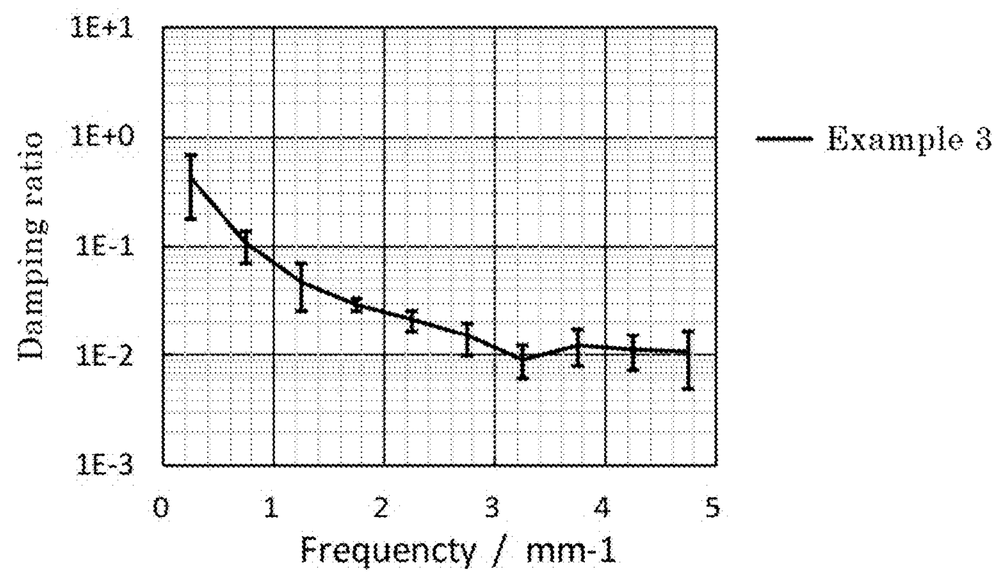
FIG. 16 is a graph showing a relation between a damping ratio and a frequency in Example 3.

A film was prepared in the same method as in Example 1, except that the thickness of the adhesive layer was set to $20\times10^{-5}$ m. This film was subjected to the moldability evaluation, the appearance evaluation, the adhesiveness evaluation, and the calculation of fc. The results are shown in Table 1 and FIG. 16.

Example 4

Figure 17:
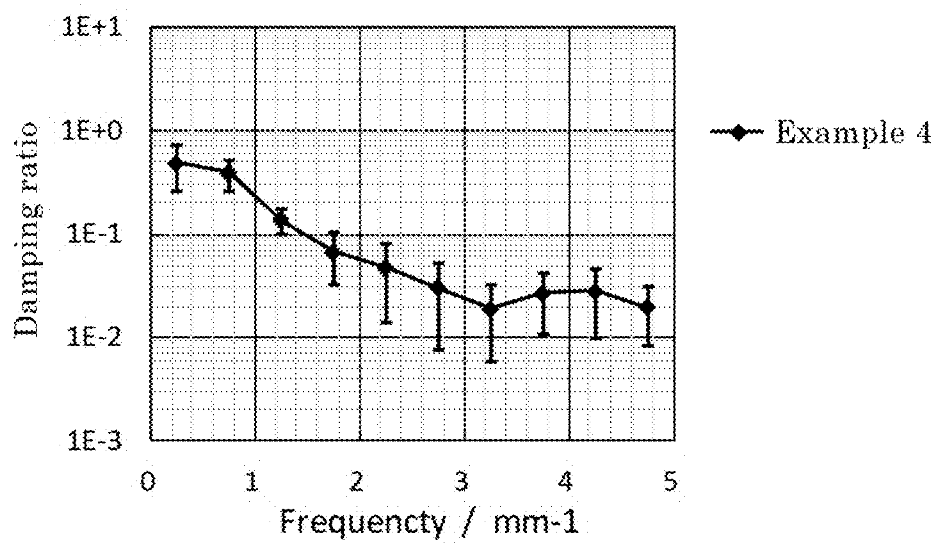
FIG. 17 is a graph showing a relation between a damping ratio and a frequency in Example 4.

A film was prepared in the same method as in Example 1, except that in Example 1, the substrate layer composition 2 obtained in Production Example 2 was used as the substrate layer, and that the thickness of each of the layers was set as shown Table 1. This film was subjected to the moldability evaluation, the appearance evaluation, the adhesiveness evaluation, and the calculation of fc. The results are shown in Table 1 and FIG. 17.

Example 5

Figure 18:
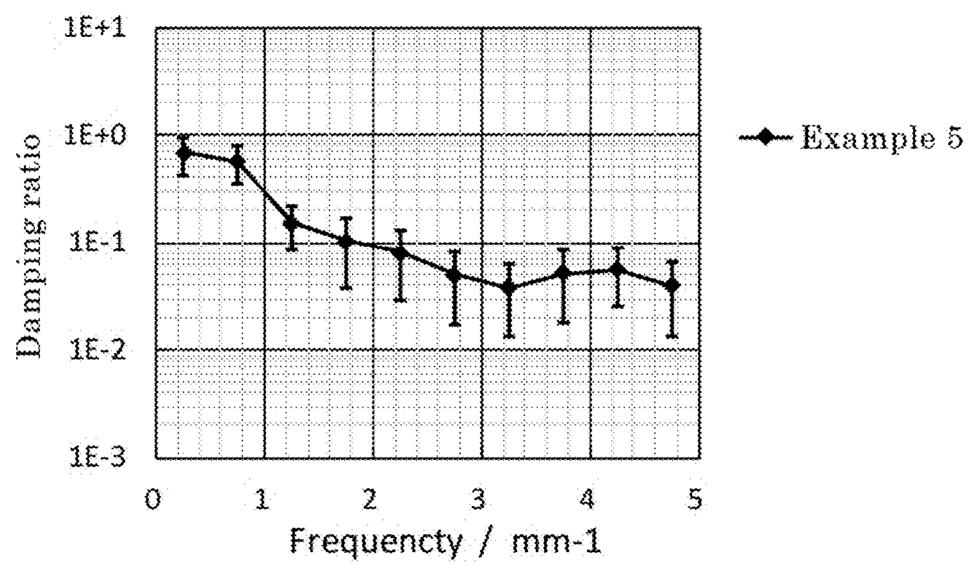
FIG. 18 is a graph showing a relation between a damping ratio and a frequency in Example 5.

A film was prepared in the same method as in Example 4, except that in Example 4, the adhesive layer composition 2 obtained in Production Example 4 was used as the substrate layer, and that the thickness of each of the layers was set as shown in Table 1. This film was subjected to the moldability evaluation, the appearance evaluation, the adhesiveness evaluation, and the calculation of fc. The results are shown in Table 1 and FIG. 18.

Example 6

Figure 19:
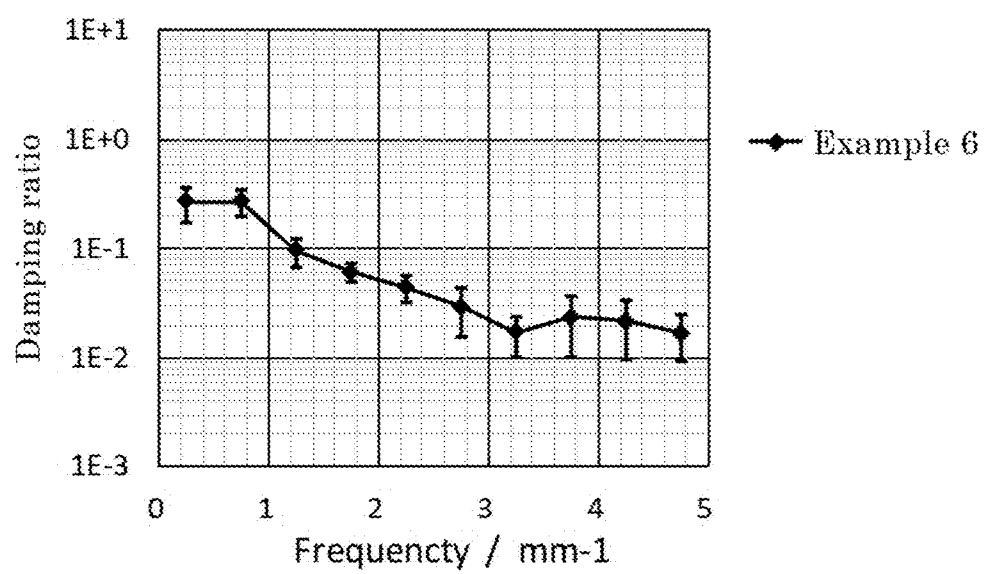
FIG. 19 is a graph showing a relation between a damping ratio and a frequency in Example 6.

A film was prepared in the same method as in Example 4, except that in Example 4, the adhesive layer composition 3 obtained in Production Example 5 was used as the adhesive layer. This film was subjected to the moldability evaluation, the appearance evaluation, the adhesiveness evaluation, and the calculation of fc. The results are shown in Table 1 and FIG. 19.

Comparative Example 1

A PET film ("LUMIRROR", manufactured by Toray Industries, Inc.) was used as the film. With respect to this film, the measurement of elongation at break and the moldability evaluation were performed at a molding temperature of 140° C. and 160° C., respectively. But, this film was broken on the way of molding. In consequence, the appearance evaluation and the calculation of fc could not be performed.

Comparative Example 2

A 3M Wrap Film Series 1080 ("1080-G12", manufactured by 3M Company) composed of, as the adhesive layer, an acrylic resin having a thickness of $3\times10^{-5}$ m and, as a substrate layer, a polyvinyl chloride resin (PVC) having a thickness of $90\times10^{-5}$ m was used as the film. This film was subjected to the moldability evaluation, the appearance evaluation, the adhesiveness evaluation, and the calculation of fc. The results are shown in Table 1. In the appearance evaluation of the decorative molded product, concaves and convexes were visualized on the surface.

Comparative Example 3

Figure 20:
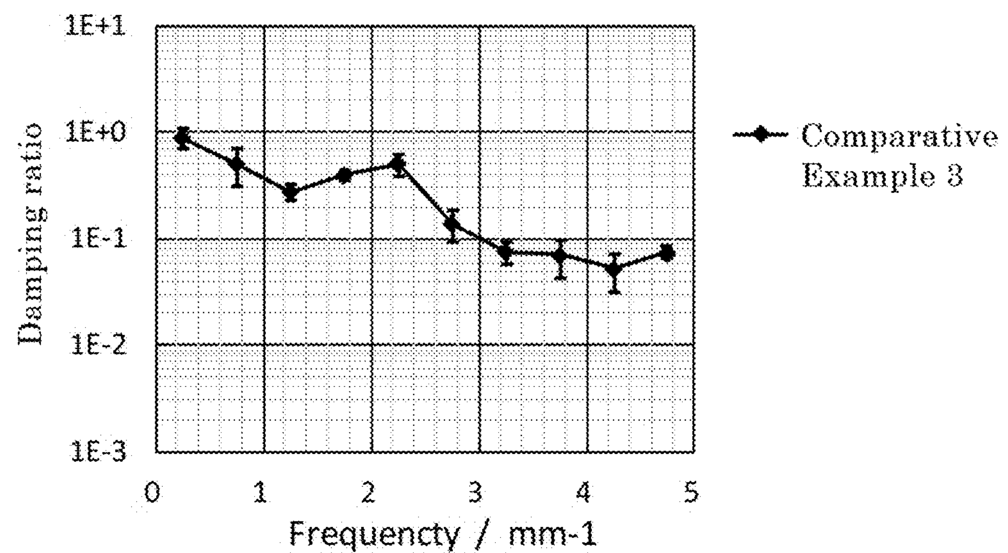
FIG. 20 is a graph showing a relation between a damping ratio and a frequency in Comparative Example 3.

A Control Tac™ Comply™ Film ("180C-12", manufactured by 3M Company) composed of, as the adhesive layer, an acrylic resin having a thickness of $6\times10^{-5}$ m and, as a substrate layer, a polyvinyl chloride-based resin (PVC) having a thickness of $3\times10^{-5}$ m was used as the film. This film was subjected to the moldability evaluation, the appearance evaluation, the adhesiveness evaluation, and the calculation of fc. The moldability evaluation was performed under a condition under which the molding temperature was changed to 70° C. The results are shown in Table 1 and FIG. 20.

Comparative Example 4

Figure 21:
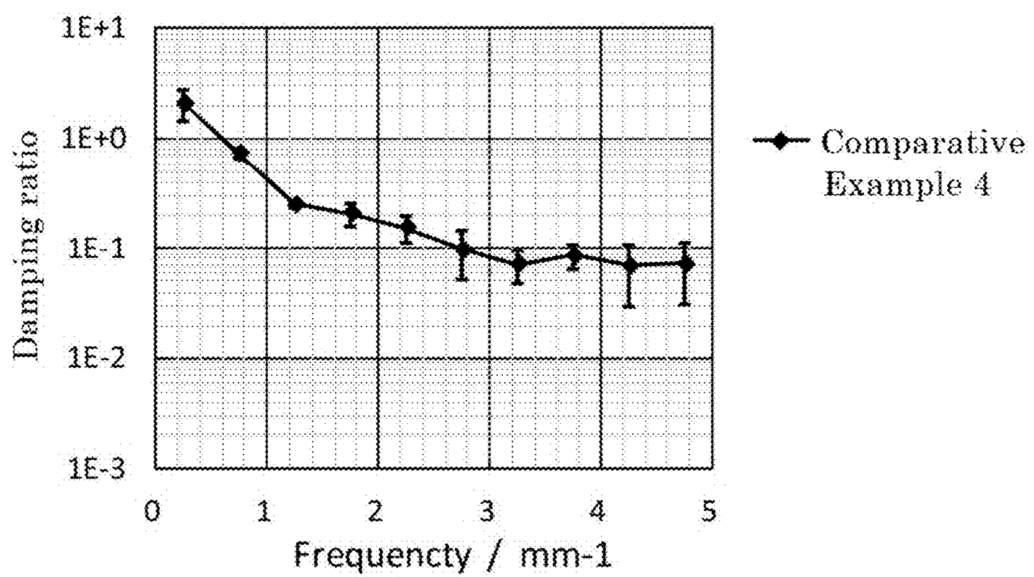
FIG. 21 is a graph showing a relation between a damping ratio and a frequency in Comparative Example 4.

A car wrapping scratch guard film (manufactured by 3M Company) having, as an adhesive layer, an acrylic resin having a thickness of $11\times10^{-5}$ m and, as a substrate layer, a polyurethane-based resin having a thickness of $11\times10^{-5}$ m was used as the film. This film was subjected to the moldability evaluation, the appearance evaluation, the adhesiveness evaluation, and the calculation of fc. The moldability evaluation was performed under a condition under which the molding temperature was changed to 120° C. The results are shown in Table 1 and FIG. 21.

TABLE 1

| | | Example 1 | Example 2 | Example 3 | Example 4 | Example 5 |
|---|---|---|---|---|---|---|
| Substrate layer | Material | Substrate layer composition1 | Substrate layer composition1 | Substrate layer composition1 | Substrate layer composition2 | Substrate layer composition2 |
| | Modulus $E_1$ [MPa] (130° C.) | 140 | 140 | 140 | 11 | 11 |
| | Thickness $t_1$ [m] | $12\times10^{-5}$ | $12\times10^{-5}$ | $12\times10^{-5}$ | $25\times10^{-5}$ | $26\times10^{-5}$ |
| | Index S of stiffness [Pa · $m^3$] | $2.4\times10^{-4}$ | $2.4\times10^{-4}$ | $2.4\times10^{-4}$ | $1.7\times10^{-4}$ | $1.7\times10^{-4}$ |
| Adhesive layer | Material | Adhesive layer composition 1 | Adhesive layer composition 1 | Adhesive layer composition 1 | Adhesive layer composition 1 | Adhesive layer composition 2 |
| | Modulus $E_2$ [MPa] (130° C.) | 0.65 | 0.65 | 0.65 | 0.65 | 1.6 |
| | Thickness $t_2$ [m] | $6\times10^{-5}$ | $10\times10^{-5}$ | $20\times10^{-5}$ | $13\times10^{-5}$ | $13\times10^{-5}$ |
| Whole of film | Tg [° C.] | 118 | 118 | 118 | 109 | 109 |
| | Elongation at break [%] | >300% | >300% | >300% | >300% | >300% |
| | (Measurement temperature of elongation at break) | (130° C.) | (130° C.) | (130° C.) | (130° C.) | (130° C.) |
| | Ratio R of modulus | 216 | 216 | 216 | 17 | 7 |
| | Ratio $t_1/t_2$ of thickness | 2.0 | 1.2 | 0.6 | 1.9 | 2.0 |
| Evaluation condition | Film processing temperature [° C.] | 130 | 130 | 130 | 130 | 130 |
| Evaluation results | $f_c$ [$mm^{-1}$] | 1.9 | 1.7 | 0.9 | 1.6 | 1.8 |
| | Moldability | A | A | A | A | A |
| | Appearance | B | B | A | B | B |
| | Adhesiveness to PP resin | A | A | A | A | A |
| | Adhesiveness to ABS resin | A | A | A | A | A |
| | Adhesiveness to acrylic resin | A | A | A | A | A |

| | | Example 6 | Comparative Example 1 | Comparative Example 2 | Comparative Example 3 | Comparative Example 4 |
|---|---|---|---|---|---|---|
| Substrate layer | Material | Substrate layer composition2 | PET | Polyvinyl chloride | Polyvinyl chloride | Polyurethane-based resin |
| | Modulus $E_1$ [MPa] (130° C.) | 11 | — | — | 64 | 4 |
| | Thickness $t_1$ [m] | $25\times10^{-5}$ | $7.5\times10^{-5}$ | $90\times10^{-5}$ | $3\times10^{-5}$ | $11\times10^{-5}$ |
| | Index S of stiffness [Pa · $m^3$] | $1.7\times10^{-4}$ | — | — | $1.7\times10^{-6}$ | $5.3\times10^{-6}$ |
| Adhesive layer | Material | Adhesive layer composition 3 | — | Acrylic resin | Acrylic resin | Acrylic resin |
| | Modulus $E_2$ [MPa] (130° C.) | 0.24 | — | — | 0.084 | 0.083 |
| | Thickness $t_2$ [m] | $13\times10^{-5}$ | — | $3\times10^{-5}$ | $6\times10^{-5}$ | $11\times10^{-5}$ |
| Whole of film | Tg [° C.] | 109 | 120 | — | 60 | 80 |
| | Elongation at break [%] | >300% | 47%/44% | >300% | >300% | >300% |
| | (Measurement temperature of elongation at break) | (130° C.) | (140° C./160° C.) | (130° C.) | (130° C.) | (130° C.) |
| | Ratio R of modulus | 47 | — | — | 762 | 48 |
| | Ratio $t_1/t_2$ of thickness | 1.9 | — | 30.0 | 0.5 | 1.0 |
| Evaluation condition | Film processing temperature [° C.] | 130 | 140/160 | 130 | 70 | 120 |
| Evaluation results | $f_c$ [$mm^{-1}$] | 1.3 | — | 3.3 | 2.8 | 2.3 |
| | Moldability | A | B | A | A | A |
| | Appearance | A | — | C | C | C |
| | Adhesiveness to PP resin | B | C | C | C | B |
| | Adhesiveness to ABS resin | A | C | B | C | A |
| | Adhesiveness to acrylic resin | A | C | A | C | A |

From Table 1, it was noted that by using the films of Examples 1 to 6, it is possible to undergo decoration on the adhered having a three-dimensional shape without causing breakage, and the moldability is favorable. In addition, it was noted that the films of Examples 1 to 6 are able to reduce the fine concaves and convexes of the surface of the wrapping film sheet that is the adherend, and a decorative molded product with a favorable appearance quality is obtained. In addition, it was noted that though Examples 1 to 3 are different from Examples 4, 5, and 6, respectively with respect to the materials constituting the substrate layer and the adhesive layer of the film, so far as the predetermined physical properties that are prescribed in the present invention are satisfied, the evaluation results become favorable.

INDUSTRIAL APPLICABILITY

In accordance with the present invention, it is possible to provide a film which is able to undergo decoration even on an adherend having a three-dimensional shape along the shape, is favorable in moldability, reduces concaves and convexes of the surface of an adherend, and makes the appearance quality of a decorative molded product favorable. The film of the present invention is suitable as a decorative film.

REFERENCE SIGNS LIST

1: Film

2: Adherend

The invention claimed is:

1. A film comprising:

a substrate layer comprising a methacrylic resin and an elastic body; and an adhesive layer comprising a thermoplastic resin; wherein the elastic body is at least one of an acrylic block copolymer having a methacrylic acid ester polymer block and an acrylic acid ester polymer block and a multilayered structure containing an inner layer of a crosslinked elastic body of a copolymerized monomer mixture of an acrylic acid alkyl ester and a crosslinkable monomer and an outer layer of a polymerized monomer mixture containing methyl methacrylate in an amount of 80% by mass or more, wherein the adhesive layer contains an acrylic resin and/or an aromatic vinyl-based elastomer, wherein R expressed by $R=E_1/E_2$ is 7 or more, wherein $E_1$ is a modulus of the substrate layer and E2 is a modulus of the adhesive layer, wherein when a highest temperature of glass transition temperatures of the film is designated as Tg [° C.], a temperature T [° C.] at which an elongation at break is 50% or more exists in a range of Tg to (Tg+50 [° C.], and the film satifies the following requirement:

when the film is adhered to an abrasive grain surface of a polyester film sheet comprising, as an abrasive grain, aluminum oxide having a grain size of 12 μm coated thereon and thus, a film surface when adhering the film to the abrasive grain surface comprises concaves and convexes, an amplitude relative to a spatial frequency f is designated as $A_1(f)$; with respect to the concaves and convexes of the film surface when adhering the film to the abrasive grain surface at any temperature of the range of Tg to (Tg+50 [° C.]) and a pressure of 0.3 MPa, an amplitude relative to the spatial frequency f is designated as $A_2(f)$; and a ratio of $A_2(f)$ to $A_1(f)$ is designated as $\varphi(f)=A_2(f)/A_1(f)$, a minimum value fc of spatial frequencies where $\varphi(f)$ is 0.1 is 2.0 $mm^{-1}$ or less.

2. The film according to claim 1, wherein the adhesive layer is a methyl methacrylate resin sheet and when adhered to the polyester film sheet of the requirement at any temperature of the range of Tg to (Tg+50 [° C.]) and a pressure of 0.3 MPa, a peel strength in JIS K6854-1 is 5 N/25 mm or more.

3. The film according to claim 1, wherein when a thickness of the substrate layer is designated as $t_1$[m], and a modulus of the substrate layer at the temperature T [° C.] is designated as $E_1$ [Pa], S [$Pa \cdot m^3$] expressed by $S=E_1 \times t_1^3$ is from $1.2\times10^{-4}$ $Pa \cdot m^3$ to $80\times10^{-4}$ $Pa \cdot m^3$.

4. The film according to claim 3, wherein when a thickness of the adhesive layer is designated as $t_2$ [m] and a modulus of the adhesive layer at the temperature T [° C.] is designated as $E_2$ [Pa], $t_2$ [m] is $5\times10^{-5}$ m or more.

5. The film according to claim 3, wherein a ratio $(t_1/t_2)$ of the thickness $t_1$ [m] of the substrate layer and the thickness $t_2$ [m] of the adhesive layer is from 0.1 to 3.

6. The film according to claim 1, wherein when a thickness of the substrate layer is designated as $t_1$ [m] and a modulus of the substrate layer at 130° C. is designated as $E_1'$ [Pa], S [$Pa \cdot m^3$] expressed by $S=E_1' \times t_1^3$ is from $1.2\times10^{-4}$ $Pa \cdot m^3$ to $80\times10^{-4}$ $Pa \cdot m^3$.

7. The film according to claim 6, wherein when a thickness of the adhesive layer is designated as $t_2$ [m] and a modulus of the adhesive layer at 130° C. is designated as $E_2'$ [Pa], $t_2$ [m] is $5\times10^{-5}$ m or more and R expressed by $R=E_1'/E_2'$ is 7 or more.

8. The film according to claim 6, wherein a ratio $(t_1/t_2)$ of the thickness $t_1$ [m] of the substrate layer and the thickness $t_2$ [m] of the adhesive layer is from 0.1 to 3.

9. A decorative molded product comprising the film according to claim 1 adhered to a surface of an adherend, wherein the surface of the adherend to which the film is adhered has a concave part or a convex part each having a width W of 0.1 μm or more and a height H of 0.02 μm or more, with a ratio (H/W) of the height H to the width W being 0.02 or more.

10. A method of producing the decorative molded product according to claim 9, comprising adhering the film to the adherend through vacuum molding and/or pressure molding.

11. The production method according to claim 10, wherein on adhering the film to the adherend through vacuum molding and/or pressure molding, an adhesive temperature is in the range of Tg to (Tg+50 [° C.]).

12. The film according to claim 1, wherein, the thickness $t_1$ [m] of the substrate layer is $5\times10^{-5}$ m or more, and the thickness $t_2$ [m] of the adhesive layer is $5\times10^{-5}$ m or more.

13. The film according to claim 1, wherein the thickness $t_1$ [m] of the substrate layer is $5\times10^{-5}$ m or more, the thickness $t_2$ [m] of the adhesive layer is $5\times10^{-5}$ m or more, and a ratio $(t_1/t_2)$ of the thickness $t_1$ [m] of the substrate layer and the thickness $t_2$ [m] of the adhesive layer is 0.1 or more and 3 or less.

* * * * *